US012266334B2

(12) United States Patent
Zhang et al.

(10) Patent No.: US 12,266,334 B2
(45) Date of Patent: Apr. 1, 2025

(54) SOUND LEAKAGE REDUCTION DEVICES AND ACOUSTIC OUTPUT DEVICES

(71) Applicant: SHENZHEN SHOKZ CO., LTD., Guangdong (CN)

(72) Inventors: Lei Zhang, Shenzhen (CN); Junjiang Fu, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 243 days.

(21) Appl. No.: 17/932,304

(22) Filed: Sep. 15, 2022

(65) Prior Publication Data

US 2023/0129310 A1 Apr. 27, 2023

Related U.S. Application Data

(63) Continuation of application No. PCT/CN2021/125794, filed on Oct. 22, 2021.

(51) Int. Cl.

*H04R 1/22* (2006.01)
*G10K 11/00* (2006.01)
*G10K 11/172* (2006.01)
*H04R 1/28* (2006.01)

(52) U.S. Cl.

CPC .......... *G10K 11/172* (2013.01); *G10K 11/002* (2013.01)

(58) Field of Classification Search

CPC ...... G10K 11/172; G10K 11/002; H04R 1/22; H04R 1/28; H04R 1/2803; H04R 1/2807; H04R 1/2811; H04R 1/2823; H04R 1/2826; H04R 1/2867; H04R 1/2888;
(Continued)

(56) References Cited

U.S. PATENT DOCUMENTS 1,901,388 A * 3/1933 Wolff ........................ H04B 1/08 381/353
2,971,597 A * 2/1961 Gorike ...................... H04R 1/22 381/337
(Continued)

FOREIGN PATENT DOCUMENTS

CN 105101020 A * 11/2015
CN 206272841 U 6/2017
(Continued)

OTHER PUBLICATIONS

International Search Report in PCT/CN2021/125794 mailed on Jul. 12, 2022, 8 pages.
(Continued)

*Primary Examiner* — Edgardo San Martin
(74) *Attorney, Agent, or Firm* — Metis IP LLC

(57) ABSTRACT

The sound leakage reduction device may include an energy conversion structure, a vibration structure, and a housing. The housing may include a vibration cavity and at least one resonance cavity. The energy conversion structure may be located in the vibration cavity and connected with the vibration structure. The at least one resonance cavity may communicate with the vibration cavity through at least one communication hole. A volume of each resonance cavity may be smaller than a volume of the vibration cavity.

20 Claims, 15 Drawing Sheets

(58) Field of Classification Search
CPC .. H04R 1/2846; H04R 1/2849; H04R 1/2838; H04R 1/2842; H04R 9/18; H04R 2460/13
See application file for complete search history.

(56) References Cited

U.S. PATENT DOCUMENTS

| | | | | | |
|---|---|---|---|---|---|
| 3,246,721 | A * | 4/1966 | Martin | H04R 1/225 381/337 |
| 3,953,675 | A * | 4/1976 | Babb | H04R 1/2888 181/198 |
| 4,211,898 | A * | 7/1980 | Atoji | H04R 1/225 381/74 |
| 4,424,881 | A * | 1/1984 | Hattori | H04R 1/025 181/150 |
| 4,742,887 | A * | 5/1988 | Yamagishi | H04R 1/22 381/372 |
| 4,889,208 | A * | 12/1989 | Sugihara | H04R 1/288 181/151 |
| 5,932,850 | A | 8/1999 | Sabato et al. | |
| 6,324,292 | B1 * | 11/2001 | Mitsuhashi | H04R 1/288 381/345 |
| 6,862,360 | B2 * | 3/2005 | Tsai | H04R 1/2819 381/345 |
| 7,508,933 | B2 * | 3/2009 | Yang | H05K 1/181 381/345 |
| 8,311,258 | B2 * | 11/2012 | Lin | H04R 1/1041 381/345 |
| 9,729,978 | B2 * | 8/2017 | Qi | G10K 9/22 |
| 9,813,802 | B2 * | 11/2017 | Shi | H04R 1/20 |
| 10,511,900 | B2 * | 12/2019 | Yoneyama | H04R 1/288 |
| 2006/0098829 | A1 * | 5/2006 | Kobayashi | H04R 1/1091 381/151 |
| 2007/0053536 | A1 * | 3/2007 | Westerkull | H04R 25/606 381/326 |
| 2008/0267438 | A1 * | 10/2008 | Chen | H04R 1/2811 381/345 |
| 2019/0281381 | A1 | 9/2019 | Tao et al. | |
| 2020/0045415 | A1 | 2/2020 | Wu et al. | |
| 2020/0100021 | A1 | 3/2020 | Pavlov et al. | |
| 2020/0228902 | A1 | 7/2020 | Liao et al. | |
| 2021/0127184 | A1 | 4/2021 | Fukuda | |
| 2021/0168525 | A1 | 6/2021 | Qi et al. | |
| 2021/0250707 | A1 | 8/2021 | Qi et al. | |
| 2022/0277723 | A1 | 9/2022 | Goo et al. | |

FOREIGN PATENT DOCUMENTS

| | | | |
|---|---|---|---|
| CN | 108566605 | A | 9/2018 |
| CN | 209659816 | U | 11/2019 |
| CN | 111182426 | A | 5/2020 |
| CN | 113473334 | A | 10/2021 |
| EP | 0456416 | A2 * | 11/1991 |
| JP | H01135294 | A * | 5/1989 |
| JP | 2018207253 | A | 12/2018 |
| WO | WO-9119406 | A1 * | 12/1991 |
| WO | 9507014 | A1 | 3/1995 |
| WO | 2019000538 | A1 | 1/2019 |

OTHER PUBLICATIONS

Written Opinion in PCT/CN2021/125794 mailed on Jul. 12, 2022, 7 pages.
The Extended European Search Report in European Application No. 21930602.4 mailed on May 24, 2023, 10 pages.
Office Action In Russian Application No. 2022125172 mailed on Mar. 23, 2023, 14 pages.

* cited by examiner

1800

SOUND LEAKAGE REDUCTION DEVICES AND ACOUSTIC OUTPUT DEVICES

CROSS REFERENCE TO RELATED APPLICATIONS

This application is a Continuation of International Application No. PCT/CN2021/125794, filed on Oct. 22, 2021, the entire contents of which are incorporated herein by reference.

TECHNICAL FIELD

The present disclosure relates to the technical field of sound conduction, and in particular, to a sound leakage reduction device and an acoustic output device.

BACKGROUND

Sound-transmitting (sound-conducting) vibration components of speakers that use bone conduction as one of the main transmission manners of sound may mechanically vibrate according to electrical signals (e.g., control signals from a signal processing circuit). The speakers may generate conducted sound waves based on the mechanical vibration. The conducted sound waves may be ultimately transmitted to the human body. In a process of mechanical vibration, the sound-transmitting vibration components of a traditional speaker may transmit the mechanical vibration to a housing structure of the speaker. The mechanical vibration may cause the housing structure to vibrate. The vibration of the housing structure may cause the surrounding air to vibrate, thereby resulting in sound leakage and affecting the sound transmission performance of the speaker.

SUMMARY

The embodiments of the present disclosure provide a sound leakage reduction device. The sound leakage reduction device may include an energy conversion structure, a vibration structure, and a housing. The housing may include a vibration cavity and at least one resonance cavity. The energy conversion structure may be located in the vibration cavity and connected with the vibration structure. The at least one resonance cavity may communicate with the vibration cavity through at least one communication hole. A volume of each resonance cavity may be smaller than a volume of the vibration cavity.

The embodiments of the present disclosure provide an acoustic output device. The acoustic output device may include the sound leakage reduction device described in any one of the embodiments of the present disclosure.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which the same reference numerals represent the same structures.

Figure 1:
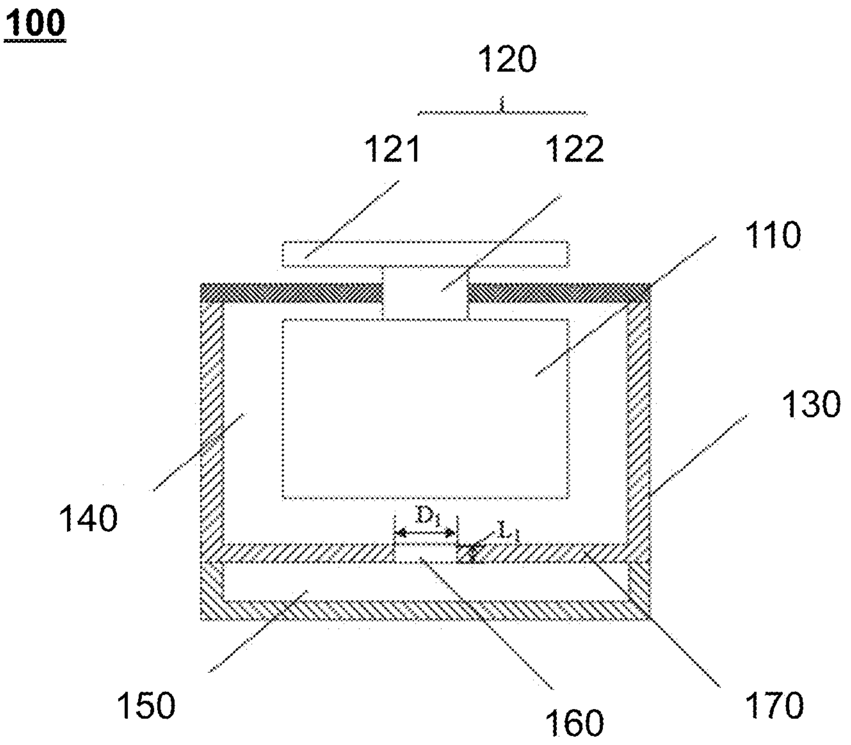
FIG. 1 is a schematic diagram illustrating an exemplary structure of a sound leakage reduction device according to some embodiments of the present disclosure.

Description of reference numerals in drawings.

110—energy conversion structure, 120—vibration structure, 121—vibration panel, 122—vibration conduction member, 130—housing, 131, 132, 133—outer wall, 140—vibration cavity, 150—resonance cavity, 160—communication hole,170, 123—side wall, 180, 181, 182—sound leakage hole, 210—first resonance cavity, 220—second resonance cavity, 230—first side wall, 231—first communication hole, 240—second side wall, 241—second communication hole, 232—third communication hole, 310—third resonance cavity, 320—fourth resonance cavity, 330—third side wall, 331—fourth communication hole, 340—fifth resonance cavity, 350—fourth side wall, 351—fifth communication hole, 190—baffle plate, 191, 192, 196—resonance cavity,1800—acoustic output device, 111—magnetic circuit device, 112—coil, 113—vibration transmission sheet, 410—bracket of the housing, 411—bracket hole, 420—ear-hook element, 430—elastic connecting piece.

DETAILED DESCRIPTION

In order to illustrate the technical solutions related to the embodiments of the present disclosure, brief introduction of the drawings referred to the description of the embodiments is provided below. Obviously, drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It will be understood that the term "system," "device," "unit," and/or "module" used herein are one method to distinguish different components, elements, parts, sections, or assembly of different levels in ascending order. However, if other words may achieve the same purpose, the words may be replaced by other expressions.

As used in the disclosure and the appended claims, the singular forms "a," "an," and "the" include plural referents unless the content clearly dictates otherwise. In general, the terms "comprises," "comprising," "includes," and/or "including" only indicate that the steps and units that have been clearly identified are included, the steps and units do not constitute an exclusive list, and the method or device may also include other steps or units.

The flowcharts used in the present disclosure illustrate operations that systems implement according to some embodiments of the present disclosure. It should be understood that a previous operation or a subsequent operation of the flowcharts may not be accurately implemented in order. Instead, each step may be processed in reverse or simultaneously. Moreover, other operations may also be added into these procedures, or one or more steps may be removed from these procedures.

FIG. 1 is a schematic diagram illustrating an exemplary structure of a sound leakage reduction device according to some embodiments of the present disclosure.

The sound leakage reduction device 100 may include an energy conversion structure 110, a vibration structure 120, and a housing 130. The housing 130 may have a vibration cavity 140 and at least one resonance cavity 150. The energy conversion structure 110 may be located in the vibration cavity 140 and connected to the vibration structure 120. The resonance cavity 150 may communicate with the vibration cavity 140 through at least one communication hole 160. A volume of the resonance cavity 150 may be smaller than a volume of the vibration cavity 140. The energy conversion structure 110 may drive the vibration structure 120 to vibrate to generate sound transmitted to a human ear. The resonance cavity 150 may be used for absorbing sound of a specific frequency generated by the energy conversion structure 110 in the vibration cavity 140, so as to suppress sound leakage at the specific frequency generated by the sound leakage reducing device 100.

The sound leakage reduction device 100 may be a device configured to reduce sound leakage of a speaker. In some embodiments, the sound leakage reduction device 100 may be a speaker with bone conduction as one of the main sound transmission manners. For example, the vibration structure 120 may be in large-area contact with the skin of the user's face and transmit mechanical vibration to the skin, so that the user may hear sound. In some embodiments, the speaker may include a bone conduction speaker, an air conduction speaker, or a bone-air conduction combined speaker. In some embodiments, the speaker may be any other feasible speaker, which is not limited in the embodiments of the present disclosure. Taking a bone conduction speaker as an example, the resonance cavity 150 in the sound leakage reduction device 100 may absorb the sound of a specific frequency generated by the energy conversion structure 110 in the vibration cavity (i.e., the vibration cavity in the form of bone conduction), so as to suppress sound leakage at the specific frequency.

The energy conversion structure 110 refers to a component that realizes the conversion of electrical signals to mechanical vibrations. In some embodiments, the energy conversion structure 110 may adopt a structure of a magnetic assembly and a voice coil, that is, audio electrical signals are input into the voice coil through electromagnetic action, and the voice coil is placed in a magnetic field to drive the vibration of the voice coil. In some embodiments, the energy conversion structure 110 may adopt a piezoelectric ceramic structure to convert electrical signals into shape changes of ceramic components to generate vibrations. In other embodiments, the energy conversion structure 110 may adopt any other feasible structural form, which is not limited in the embodiments of the present disclosure.

In some embodiments, the energy conversion structure 110 may use a specific magnetic circuit assembly and vibration assembly to achieve the conversion of signals containing sound information to mechanical vibrations. In some embodiments, the aforementioned conversion may include the coexistence and conversion of multiple different types of energy. For example, the electrical signals may be directly converted into the mechanical vibrations through the energy conversion structure 110 to generate sound. As another example, sound information may be contained in optical signals, and a process of converting the optical signals into the vibration signals may be realized through the energy conversion structure 110. As a further example, types of the energy that coexists and converts during a working process of the energy conversion structure 110 may also include other types, such as thermal energy, magnetic field energy, or the like. In some embodiments, the energy conversion manners of the energy conversion structure 110 may include a moving coil type, an electrostatic type, a piezoelectric type, a moving iron type, a pneumatic type, an electromagnetic type, or the like. In some embodiments, a vibration body of the vibration assembly in the energy conversion structure 110 may be a mirror-symmetrical structure, a centrosymmetrical structure, or an asymmetrical structure. In some embodiments, the aforementioned vibration body may be a ring structure. Multiple struts converging toward a center are disposed in the ring body. A count of the struts may be two or more. In some embodiments, the aforementioned vibration body may be provided with discontinuous hole-like structures, so that the vibration body may generate greater displacement, thereby improving output power of vibration and sound, and achieving higher sensitivity.

The housing 130 may be a housing structure configured to accommodate the energy conversion structure 110 and form the vibration cavity 140. In some embodiments, the housing 130 may be a single-cavity structure that accommodates the energy conversion structure 110. In some embodiments, the housing 130 may be a multi-cavity (i.e., more than one vibration cavity formed) structure that accommodates the energy conversion structure 110. In some embodiments, a structural shape of the housing 130 may be cylindrical, square, or any other feasible structural shapes. In other embodiments, the housing 130 may adopt other feasible structural forms or structural shapes, which are not limited in the embodiments of the present disclosure.

The vibration cavity 140 may be a vibration cavity formed by the housing 130 and the energy conversion structure 110 in the housing 130. In some embodiments, the mechanical vibrations generated by the energy conversion structure 110 may be transmitted to the vibration structure 120. The vibration structure 120 may vibrate synchronously under the driving of the energy conversion structure 110, at the same time, the vibrations of the energy conversion structure 110 relative to the housing 130 will also generate sound waves in the vibration cavity 140.

In some embodiments, the energy conversion structure 110 may form a magnetic field within the vibration cavity. The magnetic field may be used to convert signals containing sound information into vibration signals. In some embodiments, the aforementioned sound information may include video or audio files with a specific data format, or data or files that may be converted into sound through a specific approach. In some embodiments, the aforementioned signals containing sound information may come from a storage assembly of the sound leakage reduction device 100, or an external information generation, storage or transmission system. In some embodiments, the aforementioned signals containing sound information may include electrical signals, optical signals, magnetic signals, mechanical signals, or the like, or any combination thereof. In some embodiments, the aforementioned signals containing sound information may originate from one signal source or multiple signal sources. In some embodiments, the aforementioned multiple signal sources may or may not be correlated.

In some embodiments, the sound leakage reduction device 100 may obtain the aforementioned signals containing sound information in various manners. The obtaining of the signals may be wired or wireless, and real-time or delayed. For example, the sound leakage reduction device 100 may receive electrical signals containing sound information in a wired or wireless manner, or directly obtain data from a storage medium (e.g., a storage assembly) to generate sound signals. As another example, the sound leakage reduction device 100 may include an assembly with a sound collection function. By collecting sounds in the environment, the sound leakage reduction device 100 may convert the mechanical vibrations of the sound into electrical signals. Electrical signals meeting specific requirements may be obtained after processing the electrical signals by an amplifier. In some embodiments, the aforementioned storage medium may store signals containing sound information. In some embodiments, the aforementioned storage medium may adopt any feasible form of storage, e.g., including one or more storage devices, or the like.

The vibration structure 120 may be a component that realizes the transmission of mechanical vibrations to the human ear, specifically, the transmission of the mechanical vibrations through human skin (e.g., facial skin). In some embodiments, the vibration structure 120 may include a vibration panel 121 and a vibration conduction member 122. One end of the vibration conduction member 122 away from the energy conversion structure 110 may be located outside the housing 130 and connected to the vibration panel 121 which is also located outside the housing 130. The other end (the end away from the vibration panel 121) of the vibration conduction member 122 may penetrate through the housing 130 and extend into the vibration cavity 140, so that a part of the vibration conduction member 122 is located in the generating cavity 140 and connected to the energy conversion structure 110. The mechanical vibrations generated by the energy conversion structure 110 may be transmitted to the vibration panel 121 through the vibration conduction member 122. The vibration panel 121 may be in contact with the human skin (for example, facial skin), thereby transmitting the mechanical vibrations (i.e., bone conduction sound waves) to the user's human ear.

In some embodiments, a structural shape of the vibration panel 121 may include cylindrical, square, or any other feasible structural shape. In other embodiments, the vibration panel 121 may adopt other feasible structural forms or shapes, which are not limited in the embodiments of the present disclosure.

In some embodiments, a connection manner between the vibration structure 120 and the energy conversion structure 110 is not limited to the above-mentioned direct connection, and may also be an indirect connection. For example, the sound leakage reduction device 100 may further include a connecting member (not shown). The connecting member may be located in the vibration cavity 140. One end of the connecting member may be connected with an inner wall of the housing 130, and the other end of the connecting member may be connected with the vibration structure 120 (e.g., the vibration conduction member 122). The mechanical vibrations generated by the energy conversion structure 110 may be transmitted to the housing 130. The vibration of the housing 130 may be transmitted to the vibration conduction member 122 of the vibration structure 120 through the connecting member. The bone conduction sound waves may be further transmitted to the user through the vibration panel 121. In some embodiments, there is no need to provide an additional component as the connecting member, and an assembly on the housing 130 used to close an upper surface of the housing may be used as a connecting member to connect the vibration panel 121 and the vibration conduction piece 122, which improves the vibration conduction efficiency and at the same time has the advantage of compact structure.

In some embodiments, the housing 130 may be integrally formed. In some embodiments, the housing 130 may be assembled by a mean of plugging, clipping, or the like. In some embodiments, the housing 130 may be made of metallic materials (e.g., copper, aluminum, titanium, gold, etc.), alloy materials (e.g., aluminum alloys, titanium alloys, etc.), plastic materials (e.g., polyethylene, polypropylene, epoxy, nylon, etc.), fiber material (e.g., acetate fiber, propionate fiber, carbon fiber, etc.), etc. In some embodiments, a protective cover may be provided outside the housing 130. The protective cover may be made of a soft material with certain elasticity, such as soft silicone, rubber, etc., to provide a better tactile feeling for the user to wear.

The resonance cavity 150 may be configured to absorb the sound of a specific frequency generated by the energy conversion structure 110 in the vibration cavity 140, thereby suppressing the sound leakage at the specific frequency generated by the sound leakage reduction device 110.

Merely by way of example, for ease of understanding, the resonance cavity 150 may be equivalent to a Helmholtz resonance cavity. When frequencies of leakage sound waves in the vibration cavity 140 are consistent with a natural frequency of the resonance cavity 150, resonance occurs. The leakage sound waves and the inner wall of the resonance cavity 150 rub against each other to consume sound energy and achieve the purpose of sound absorption. A center frequency of the Helmholtz resonance cavity may be calculated by formula (1) below:

$$f_0=c/2\pi\sqrt{S/V_0(l_0+1.7r)} \quad (1),$$

where $f_0$ represents the center frequency of the Helmholtz resonance cavity, r represents a pipe radius of the Helmholtz resonance cavity, and $l_0$ represents a pipe length of the Helmholtz resonance cavity, S represents a pipe cross-sectional area of the Helmholtz resonance cavity, $V_0$ represents a volume of the Helmholtz resonance cavity, and c represents a speed of sound transmission in air.

In some embodiments, a sound leakage hole may be provided on an outer housing of the housing 130, so that sound waves in the vibration cavity 140 may be led out of the housing 130 and interfere with the sound leakage waves generated by the vibration of the housing 130 to reduce sound leakage. Although this sound leakage reduction method reduces sound leakage to a certain extent, in a wide frequency range, the sound leakage reduction effect for sound waves of a specific frequency is not ideal. By adding the resonance cavity 150 outside the vibration cavity 140 and adjusting the structure and setting of the vibration cavity 140 and the resonance cavity 150, the sound waves of the specific frequency range in the vibration cavity 140 may be absorbed in a targeted manner, further, sound waves derived from the sound leakage hole are adjusted, so as to improve the sound leakage reduction effect of the sound leakage hole. In some embodiments, the outer housing of the housing 130 may not be provided with the sound leakage hole. In such cases, vibration formed when the resonance cavity 150 absorbs part of the sound waves in the vibration cavity 140 may adjust the vibration of the housing 130, which may also achieve the effect of reducing the sound leakage of the housing 130.

In some embodiments, the resonance cavity 150 may be an additional cavity based on the vibration cavity 140. For example, the resonance cavity 150 and the vibration cavity 140 may share a side wall. The acoustic communication between the resonance cavity 150 and the vibration cavity 140 may be achieved through one or more communication holes 160 on the side wall. In some embodiments, the resonance cavity 150 may be a cavity separate from the vibration cavity 140. For example, the resonance cavity 150 and the vibration cavity 140 respectively have an independent side wall. The acoustic communication between the resonance cavity 150 and the vibration cavity 140 may be achieved through one or more sound guide pipes. In some embodiments, the resonance cavity 150 may include one resonance cavity or multiple resonance cavities. In some embodiments, at least one hole capable of realizing air conduction communication may be provided between the vibration cavity 140 and the resonance cavity 150, or between the vibration cavity 140 and multiple resonance cavities of the resonance cavity 150. Merely by way of example, as shown in FIG. 1, at least one communication hole 160 may be disposed on a side wall 170 for separating the resonance cavity 150 and the vibration cavity 140 (which may be regarded as a pipe part of the Helmholtz resonance cavity). The at least one communication hole 160 is used to realize air conduction communication between the vibration cavity 140 and the resonance cavity 150. In other embodiments, the resonance cavity 150 may also be any other feasible resonant cavity, which is not limited in the embodiments of the present disclosure.

In some embodiments, a wall (e.g., the side wall 170) of the resonance cavity 150 may be made of the same material as the housing 130. In some embodiments, the resonance cavity 150 may be made of metal materials (e.g., copper, aluminum, titanium, gold, etc.), alloy materials (e.g., aluminum alloys, titanium alloys, etc.), plastic materials (e.g., polyethylene, polypropylene, epoxy resin, nylon, etc.), fiber materials (e.g., acetate fiber, propionate fiber, carbon fiber, etc.), etc.

In the embodiments of the present disclosure, a resonance cavity is added outside the vibration cavity. The resonance cavity may absorb or cancel sound waves of a specific frequency in the vibration cavity, so as to reduce the sound leakage of the housing. In addition, the structural setting of the resonance cavity has the advantages of simple structure and easy processing.

In some embodiments, the resonance cavity 150 may reduce sound leakage at the specific frequency, that is, absorb sound waves in a specific frequency range. The specific frequency range may be a frequency range of 20 Hz to 10000 Hz (10 kHz). In some embodiments, the specific frequency range may be a frequency range that the human ear is sensitive to, for example, a frequency range of 1 kHz to 3 kHz, so as to improve the sound leakage reduction effect in the frequency range.

Figure 7:
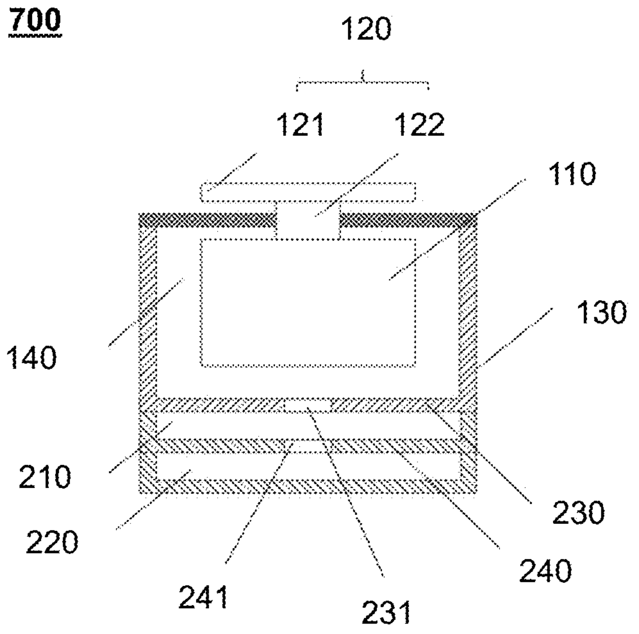
FIG. 7 is a structural diagram illustrating an exemplary structure of a sound leakage reduction device according to some embodiments of the present disclosure.
Figure 8:
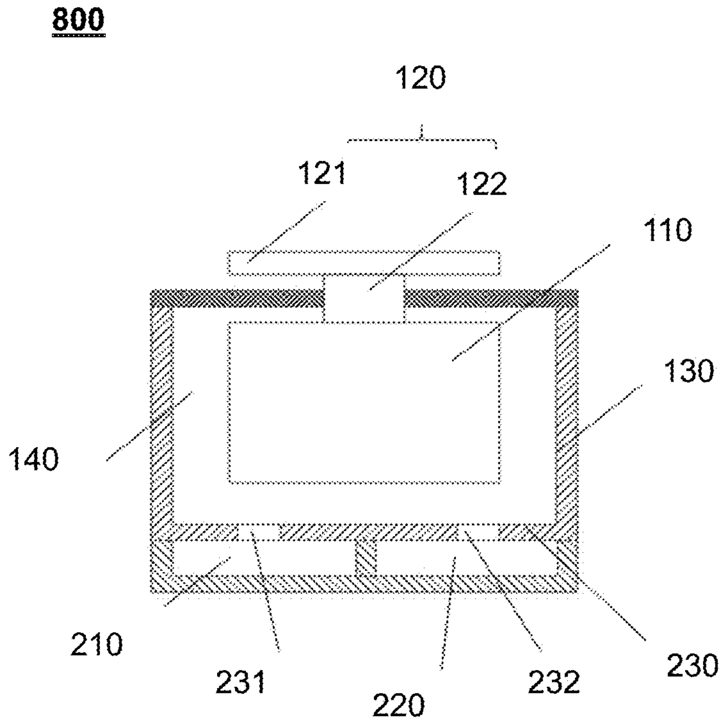
FIG. 8 is a schematic diagram illustrating an exemplary structure of a sound leakage reduction device according to some embodiments of the present disclosure.
Figure 9:
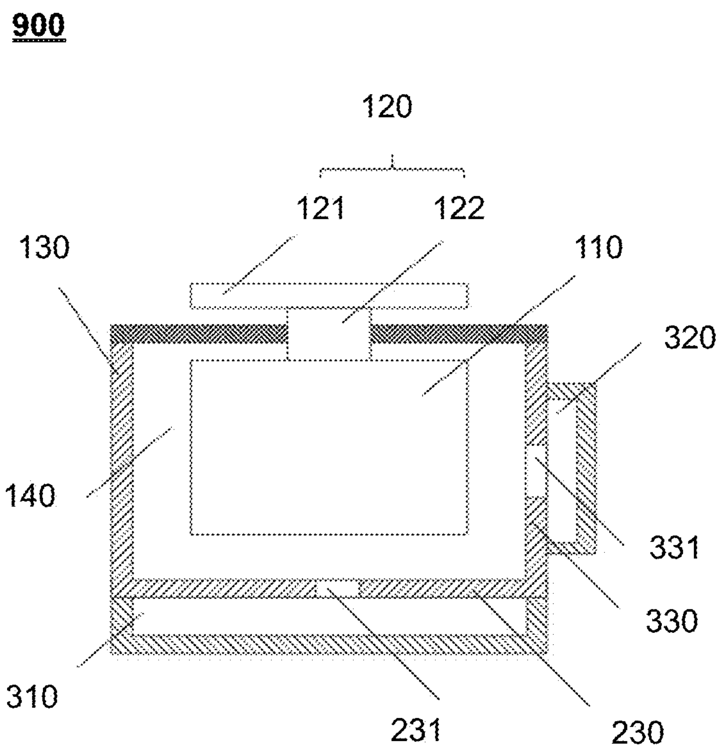
FIG. 9 is a schematic diagram illustrating an exemplary structure of a sound leakage reduction device according to some embodiments of the present disclosure.
Figure 11:
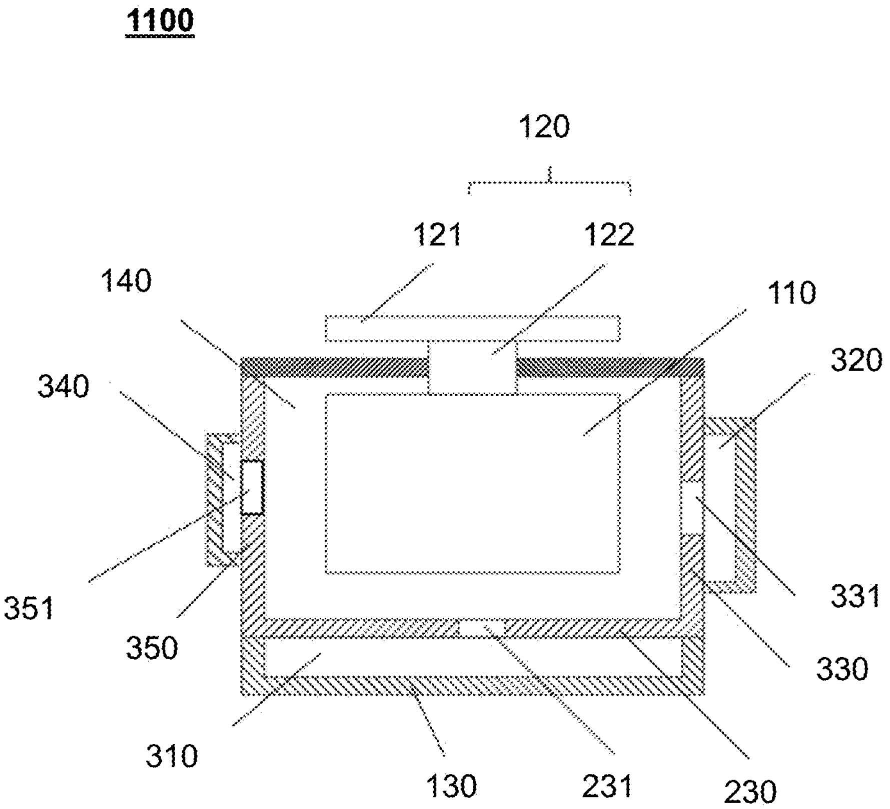
FIG. 11 is a schematic diagram illustrating an exemplary structure of a sound leakage reduction device according to some embodiments of the present disclosure.

In some embodiments, in order to realize that the sound leakage reduction device 100 meets various sound leakage reduction requirements (for example, reducing sound leakage in a specific frequency range, etc.) in various sound conduction scenarios, the structural arrangement of the sound leakage reduction device 100 may be changed in various ways. In some embodiments, the at least one resonance cavity 150 may include the multiple resonance cavities 150. The multiple resonance cavities 150 may be disposed on a same side wall (as shown in FIG. 8) or different side walls (as shown in FIG. 9) of the vibration cavity 140. Each resonance cavity 150 and the vibration cavity 140 may be in air conduction communication through at least one communication hole 160 or a sound guide pipe. For example, as shown in FIG. 1, FIG. 7, and FIG. 11, a count of the resonance cavities 150 may be changed. The count of the resonance cavities 150 may be set to one or more. A position of the resonance cavity 150 may be changed. The resonance cavity 150 may be set on any side wall of the housing 130. Different resonance cavities 150 may be disposed on a same or different side walls. As another example, a count of the communication hole 160 may be one or more. In some embodiments, according to different requirements for sound leakage reduction, the resonance cavity 150 may be set differently in terms of the count of cavities, sizes of the cavities, installation positions of the cavities, a positional relationship between the cavities, and structural shapes of the cavities, which may be not limited in the embodiments of the present disclosure.

In some embodiments, in order to enable the resonance cavity 150 to absorb sound waves in a target frequency range, according to formula (1) and an actual size of the vibration cavity 140, a volume ratio between one (or each) resonance cavity 150 and the vibration cavity 140 may be not less than 0.1, so that the resonance cavity and the vibration cavity may achieve the effect of reducing sound leakage at the specific frequency within the widest possible range of the volume ratio. In some embodiments, the volume ratio between each resonance cavity 150 and the vibration cavity 140 may be 0.1-1, so that the resonance cavity and the vibration cavity may achieve the effect of reducing sound leakage at the specific frequency within a wide range of the volume ratio. The volume ratio between the resonance cavity 150 and the vibration cavity 140 may be 1/10~1/1. Alternatively, the volume ratio between a volume of the vibration cavity 140 and a volume of a single resonance cavity (for example, the first resonance cavity 210 or the second resonance cavity 220) or a total volume of multiple resonance cavities (for example, the third resonance cavity 310, the fourth resonance cavity 320, and the fifth resonance cavity 340) may be 1/10~1/1, so that the resonance cavity may cover the possible frequency range of leakage sound when absorbing the sound waves, thereby improving the sound leakage reduction efficiency. In some embodiments, according to the selection of the target frequency range, the volume ratio between the resonance cavity 150 and the vibration cavity 140 may be 1/8~2/3. Alternatively, the volume ratio between the volume of the vibration cavity 140 and the volume of a single resonance cavity (for example, the first resonance cavity 210 or the second resonance cavity 220) or the total volume of multiple resonance cavities(For example, the third resonance cavity 310, the fourth resonance cavity 320, and the fifth resonance cavity 340) may be 1/8~2/3. In some embodiments, in order to ensure that the volume of the resonance cavity may be within a suitable size range, the volume ratio between the resonance cavity 150 and the vibration cavity 140 may be 1/5~1/2. Alternatively, the volume ratio between the volume of the vibration cavity 140 and the volume of a single resonance cavity (for example, the first resonance cavity 210 or the second resonance cavity 220) or the total volume of multiple resonance cavities (for example, the third resonance cavity 310, the fourth resonance cavity 320, and the fifth resonance cavity 340) may be 1/5~1/2. In some embodiments, a frequency range of the sound leakage reduction of a single resonance cavity (for example, the first resonance cavity 210 or the second resonance cavity 220) or multiple resonance cavities (for example, the third resonance cavity 310, the fourth resonance cavity 320, and the fifth resonance cavity 340) may be calculated according to formula (1).

In some embodiments, a sound leakage hole 180 may be disposed on an outer wall of the vibration cavity and/or the resonance cavity, so that on the basis of reducing the sound leakage of the resonance cavity 150, part of sound waves in the vibration cavity is drawn out to the outside of the housing 130 to interfere with the sound leakage sound waves formed by the vibration of the housing 130 pushing the air outside the housing 130 to reduce an amplitude of the sound leakage, thereby further reducing the sound leakage. Through the convenient improvement of opening holes on the housing, the sound leakage reduction effect may be further optimized without increasing the structural volume and weight.

In some embodiments, according to different requirements for reducing sound leakage, correspondingly different settings are made on a count of holes (e.g., the communication hole 160, the sound leakage hole 180), sizes of the holes, a size ratio between the holes, positions of the holes, and/or shapes of the holes (for example, the shapes of the holes is a round or a square, as another example, the shapes of the holes is a connected hole or a non-connected hole, etc.). For example, a ratio of a diameter D1 of the communication hole 160 to a diameter D2 of the sound leakage hole 180 may be set to 1/2~2, and a ratio of a pipe length L1 of the communication hole 160 to a pipe length L2 of the sound leakage hole 180 may be set to 1/2~2. In some embodiments, the communication hole 160 or the sound leakage hole 180 may be an air conduction communication hole. In some embodiments, the communication hole 160 may be a hole for realizing the communication between the vibration cavity 140 and the resonance cavity 150. In some embodiments, the sound leakage hole 180 may be a sound guiding hole disposed on any outer wall of the housing 130 (including any outer wall of the vibration cavity 140 or the resonance cavity 150). In some embodiments, the communication hole 160 and/or the sound leakage hole 180 may be unobstructed through holes, so as to ensure the effect of absorbing sound leakage sound waves. In some embodiments, a damping layer may be disposed at an upper opening of the communication hole 160 and/or the sound leakage hole 180, so as to adjust phases and amplitudes of the sound waves, thereby correcting the effect of the derived sound waves.

In some embodiments, in order to achieve the sound leakage absorption effect at a specific frequency (e.g., 1.5 kHz) and enable the resonance cavity to absorb sound waves in the target frequency range, according to formula (1) and the actual size of the vibration cavity 140 and the resonance cavity, an area of one communication hole 160 or a total area of multiple communication holes (for example, multiple communication holes 160, multiple first communication holes 231, multiple second communication holes 241, or the first communication hole 231 and the second communication hole 241) may be set to not less than 0.05 $mm^2$, so that in the widest possible range of the area of the communication hole, the resonance cavity may cover the possible frequency range of leakage sound when absorbing the sound waves, thereby improving the sound leakage reduction efficiency. In some embodiments, the volume of one resonance cavity 150 or the total volume of multiple resonance cavities (e.g., the third resonance cavity 310, the fourth resonance cavity 320, and the fifth resonance cavity 340) may be set to not greater than 6500 $mm^3$, so that in the widest possible range of the volume of the resonance cavity, the resonance cavity may cover the possible frequency range of leakage sound when absorbing sound waves, thereby improving the sound leakage reduction efficiency. In some embodiments, the volume of one resonance cavity 150 or the total volume of multiple resonance cavities (e.g., the third resonance cavity 310, the fourth resonance cavity 320, and the fifth resonance cavity 340) may be set to not greater than 2100 $mm^3$, so that in a wide range of the volume of the resonance cavity, the resonance cavity may cover a wide frequency range of leakage sound when absorbing sound waves, thereby improving the sound leakage reduction efficiency.

In some embodiments, a diameter of one communication hole 160 or a total diameter of the multiple communication holes (for example, multiple communication holes 160, multiple first communication holes 231, multiple second communication holes 241, or the first communication hole 231 and the second communication holes 241) may be set to 0.1 mm-10 mm. A volume of one resonance cavity 150 or a total volume of multiple resonance cavities (for example, the third resonance cavity 310, the fourth resonance cavity 320, and the fifth resonance cavity 340) may be set to 65 $mm^3$-6500 $mm^3$, so that the resonant cavity may cover a wide frequency range of leakage sound when absorbing sound waves, thereby improving the sound leakage reduction efficiency. In some embodiments, according to the selection of the target frequency range, the diameter of at least one communication hole 160 or the total diameter of the multiple communication holes (for example, multiple communication holes 160, multiple first communication holes 231, multiple second communication holes 241, or the first communication hole 231 and the second communication hole 241) may be set to 0.2 mm-5 mm, the volume of one resonance cavity 150 or the total volume of the multiple resonance cavities (e.g., the third resonance cavity 310, the fourth resonance cavity 320, and the fifth resonance cavity 340) may be set to 80 $mm^3$ to 3000 $mm^3$. In some embodiments, in order to ensure that sizes of the communication hole and the resonance cavity are within an appropriate size range, the diameter of at least one communication hole 160 or the total diameter of the multiple communication holes (for example, multiple communication holes 160, multiple first communication holes 231, multiple second communication holes 241, or the first communication hole 231 and the second communication hole 241) may be set to 0.5 mm-3 mm, the volume of one resonance cavity 150 or the total volume of the multiple resonance cavities (for example, the third resonance cavity 310, the fourth resonance cavity 320, and the fifth resonance cavity 340) may be set to 100 $mm^3$ to 1000 $mm^3$.

In some embodiments, various transformation settings may be performed on the vibration structure 120 to achieve different requirements for sound leakage reduction. For example, a distance between the vibration structure 120 and the housing 130 may be changed. As another example, a shape, a size, or an area of the vibration structure 120 may be changed. More descriptions regarding the settings of the vibration structure 120 may be found elsewhere in the present disclosure. See, e.g., FIG. 14 and the descriptions thereof, which are not be repeated here.

The sound leakage reduction device provided by the embodiments of the present disclosure is further described below by way of some examples.

Figure 2:
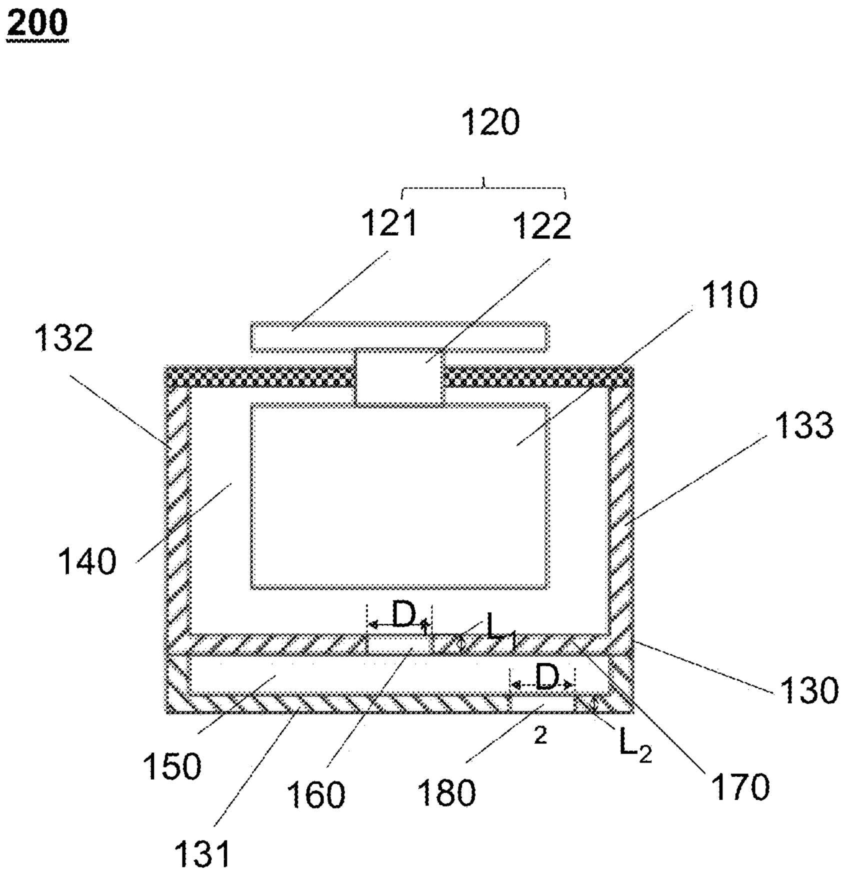
FIG. 2 is a schematic diagram illustrating an exemplary structure of a sound leakage reduction device according to some embodiments of the present disclosure.
Figure 3:
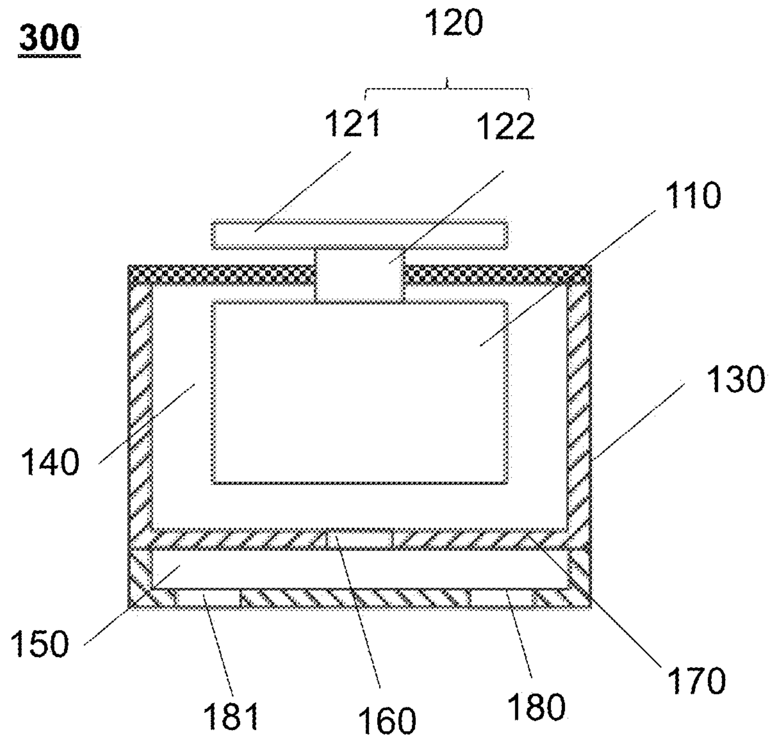
FIG. 3 is a schematic diagram illustrating an exemplary structure of a sound leakage reduction device according to some embodiments of the present disclosure.
Figure 4:
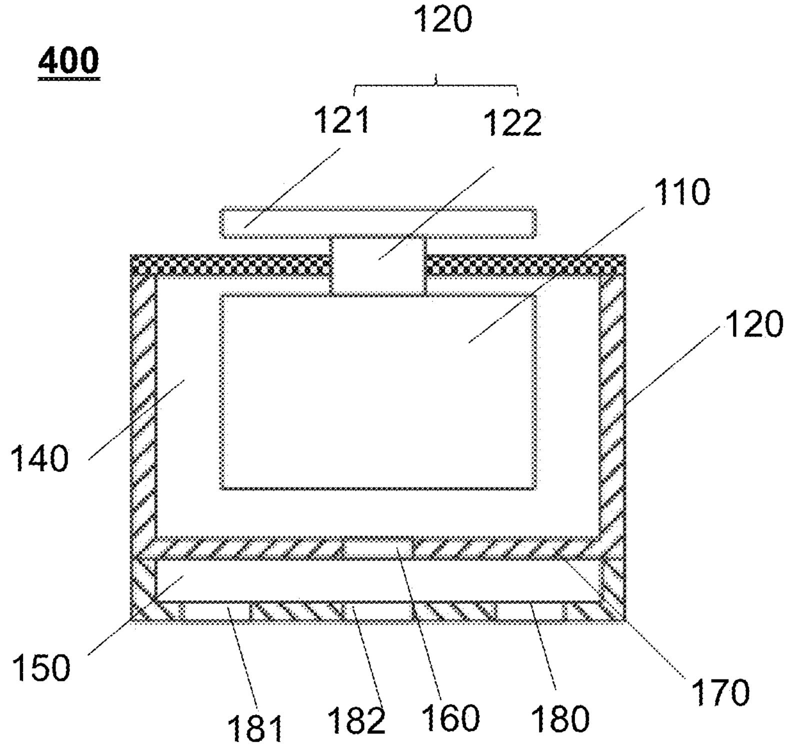
FIG. 4 is a schematic diagram illustrating an exemplary structure of a sound leakage reduction device according to some embodiments of the present disclosure.

FIGS. 2-4 are schematic diagrams each of which illustrates an exemplary structure of a sound leakage reduction device according to some embodiments of the present disclosure.

Embodiment 1

As shown in FIG. 2, a vibration cavity 140 and a resonance cavity 150 may be disposed in a housing 130 of a sound leakage reduction device 200. A communication hole 160 may be disposed on a side wall 170 between the vibration cavity 140 and the resonance cavity 150 to realize air conduction communication between the vibration cavity 140 and the resonance cavity 150. A sound leakage hole 180 may be disposed on an outer wall of the housing 130. In some embodiments, according to the selection of the corresponding target frequency range, the sound leakage hole 180 may be disposed on any outer wall of the housing 130, that is, may be disposed on an outer wall 131, an outer wall 132, or an outer wall 133. In some embodiments, according to the selection of the corresponding target frequency range, the sound leakage hole 180 may be located at any position on any outer wall of the housing, such as a middle position or an edge position of the outer wall. In some embodiments, when the sound leakage hole 180 is disposed on the outer wall (i.e., the outer wall 131 shown in FIG. 2), of the resonance cavity 150 opposite to the side wall 170, according to the selection of the corresponding target frequency range, the sound leakage hole 180 and the communication hole 160 may be disposed staggered as shown in FIG. 2, or opposite to each other (i.e., not staggered). In some embodiments, in order to meet the corresponding target frequency range, different transformation settings may be performed on a size of the communication hole 160, a size of the sound leakage hole 180, or a size ratio between the communication hole 160 and the sound leakage hole 180. A diameter of the sound leakage hole 180 may be set to be larger than a diameter of the communication hole 160. For example, a diameter ratio of the sound leakage hole 180 to the communication hole 160 may be set to 3:2, so that an expected part of sound waves may be more effectively guided to the outside of the housing 130 on the basis that the resonance cavity 150 absorbs sound waves of a specific frequency through the communication hole 160.

Embodiment 2

As shown in FIG. 3, a vibration cavity 140 and a resonance cavity 150 may be disposed in a housing 130 of a sound leakage reduction device 300. A communication hole 160 may be disposed on a side wall 170 between the vibration cavity 140 and the resonance cavity 150 to realize air conduction communication between the vibration cavity 140 and the resonance cavity 150. Two sound leakage holes 180 and 181 may be disposed on an outer wall of the housing 130. Specific positions of the sound leakage holes 180 and 181 may be similar to that of the sound leakage hole 180 in the embodiment 1, and the detailed descriptions thereof may refer to the relevant description in the embodiment 1, which will not be repeated here. In some embodiments, in order to meet the corresponding target frequency range, different transformation settings may be performed on a size of the communication hole 160, a size of the sound leakage hole 180, a size of the sound leakage hole 181, or a size ratio of the communication hole 160, the sound leakage hole 180, and the sound leakage hole 181. For example, the size of the sound leakage hole 180, the size of the sound leakage hole 181, and the size of the single sound leakage hole 180 in the embodiment 1 may be set to realize the absorption of sound waves of the same target frequency or the absorption of sound waves of different target frequencies.

Embodiment 3

As shown in FIG. 4, a vibration cavity 140 and a resonance cavity 150 may be disposed in a housing 130 of a sound leakage reduction device 400. A communication hole 160 may be disposed on a side wall 170 between the vibration cavity 140 and the resonance cavity 150 to realize air conduction communication between the vibration cavity 140 and the resonance cavity 150. Three sound leakage holes 180, 181, and 182 may be disposed on an outer wall of the housing 130. Specific positions of the sound leakage hole 180, the sound leakage hole 181, and the sound leakage hole 182 may be similar to that of the sound leakage hole 180 in the embodiment 1, and the detailed descriptions thereof may refer to the relevant description in the aforementioned embodiment 1, which will not be repeated here. In some embodiments, in order to meet the corresponding target frequency range, different transformation settings may be performed on a size of the communication hole 160, a size of the sound leakage hole 180, a size of the sound leakage hole 181, a size of the sound leakage hole 182, or a size ratio of the communication hole 160 and the sound leakage holes 180-182. For example, the size of the sound leakage hole 180, the size of the sound leakage hole 181, the size of the single sound leakage hole 180 in the embodiment 1, or the sizes of the sound leakage hole 180 and the sound leakage hole 181 in the embodiment 2 may be set to achieve equivalent settings for the same target frequency range or different settings for different target frequency ranges.

Figure 5:
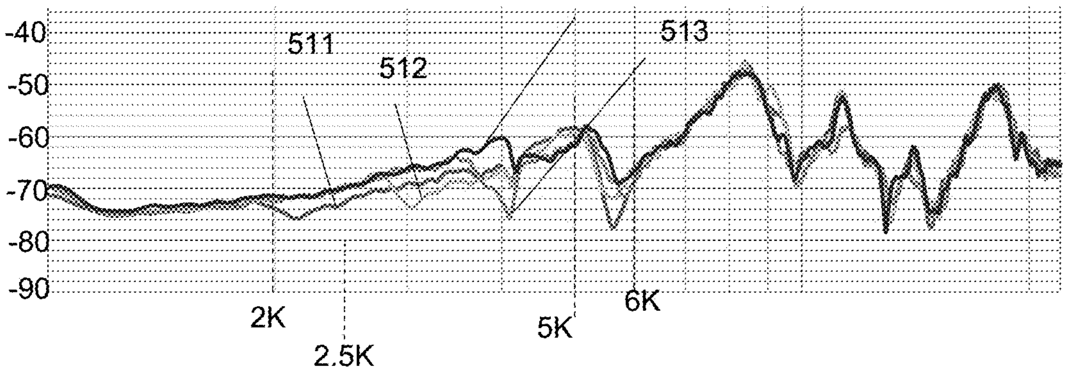
FIG. 5 is a schematic diagram illustrating curves of sound leakage of sound leakage reduction devices according to some embodiments of the present disclosure.

FIG. 5 is a schematic diagram illustrating curves of sound leakage of sound leakage reduction devices according to some embodiments of the present disclosure. An abscissa may represent a frequency of leakage sound. A unit of the frequency of the leakage sound may be Hz. A vertical axis may represent a sound pressure level of the leakage sound. A unit of the sound pressure level may be dB. Merely by way of example, a test condition may be that an earphone core sample is in a suspended state and a radio microphone is behind the ear, and a measurement position is 35 mm in front of a panel of a vibration structure when suspended. It should be noted that FIG. 5 and all curves of sound leakage and test conditions mentioned in the present disclosure are only for illustration in an exemplary manner, and should not be construed as a limitation of the present disclosure.

As shown in FIG. 5, according to a curve 511 of sound leakage of the sound leakage reduction device 100 as described in connection with FIG. 1 that is obtained after the test, a trough region is formed in a specific frequency range (such as 2 kHz-2.5 kHz, 5 kHz-6 kHz), which indicates that the sound leakage reduction effect is better in the specific frequency range. According to a curve 512 of sound leakage of the sound leakage reduction device 200 as described in connection with FIG. 2 that is obtained after the test, a trough region is formed in a specific frequency range (such as 2.5 kHz-3.5 kHz), which indicates that sound leakage reduction effect is better in the specific frequency range. According to a curve 513 of sound leakage of the sound leakage reduction device 300 as described in connection with FIG. 3 that is obtained after the test, a trough region is formed in a specific frequency range (such as 3.5 kHz-4.5 kHz), which indicates that the sound leakage reduction effect is better in the specific frequency range. According to a curve 514 of sound leakage of the sound leakage reduction device 400 as described in connection with FIG. 4 that is obtained after the test, a trough region is formed in a specific frequency range (such as 5.5 kHz-6 kHz), which indicates that sound leakage reduction effect is better in the specific frequency range.

It can be seen that the sound leakage reduction devices shown in FIGS. 2-4 achieves the sound leakage reduction effect in a specific frequency range. In addition, due to the different structure settings of the vibration cavity, the resonance cavity, the communication hole, and the sound leakage hole, the specific frequency range for achieving sound wave absorption is different. Therefore, according to FIGS. 2-5, the following conclusions can be drawn exemplarily: in a certain frequency band (e.g., 2 kHz-6 kHz), other structural settings remain unchanged, the greater a count of sound leakage holes disposed on the outer wall of the housing 130 is, the higher the target frequency for achieving sound leakage reduction is.

In other embodiments, different settings for reducing sound leakage may be obtained by changing structural parameters of the vibration cavity, the resonance cavity (e.g., shapes of the cavities, sizes of the cavities, a volume ratio between the cavities, specific positions of the cavities, a positional relationship between the cavities, etc.), the communication holes, and/or the sound leakage holes (e.g., shapes of the holes, a count of the holes, sizes of the holes, etc.), so that the sound leakage reduction device set with under different structural parameter may achieve the sound leakage reduction effect in different frequency ranges, or enhance the sound leakage reduction effect in the same frequency range. For example, instead of setting two or more communication holes of small size, the size of one communication hole on the side wall may be increased, and vice versa.

Figure 6:
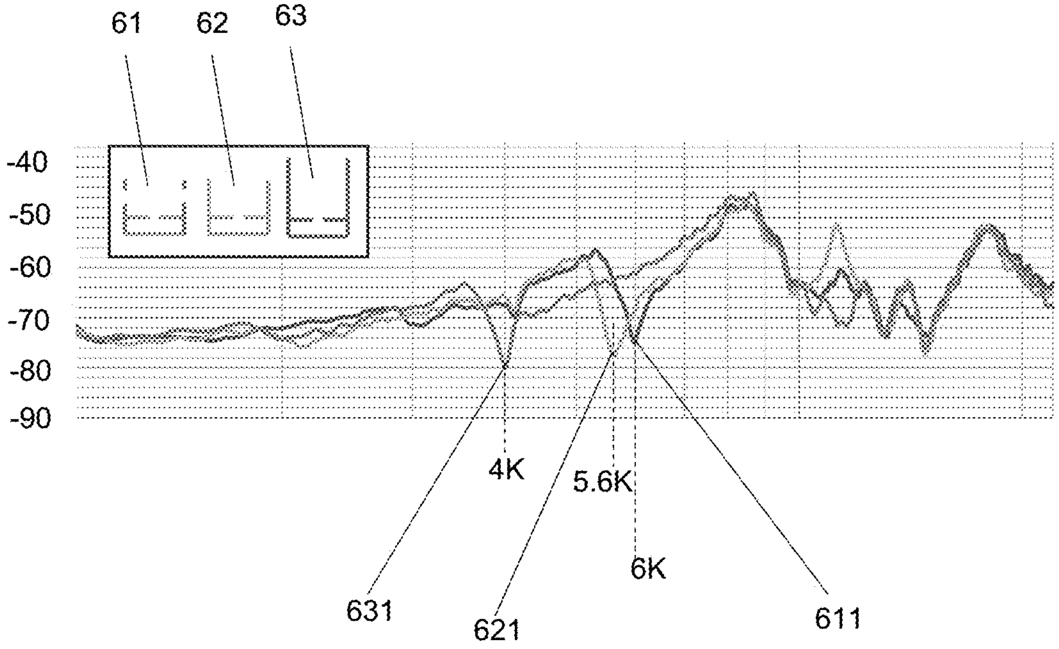
FIG. 6 is a schematic diagram illustrating curves of sound leakage of sound leakage reduction devices according to some embodiments of the present disclosure.

FIG. 6 is a schematic diagram illustrating curves of sound leakage of sound leakage reduction devices according to some embodiments of the present disclosure. As shown in FIG. 6, according to the curve of the sound leakage obtained by the test, a trough region at 5.5 kHz to 6.5 kHz is formed by a curve 611 corresponding to an example structure 61 of a sound leakage reduction device, which indicates that a resonance cavity in the example structure 61 may absorb the sound waves in the frequency range, thereby achieving the corresponding sound leakage reduction effect. A trough region at 5 kHz to 6 kHz is formed by a curve 621 corresponding to an example structure 62 of a sound leakage reduction device, which indicates that a resonance cavity in the example structure 62 may absorb the sound waves in the frequency range, thereby achieving the corresponding sound leakage reduction effect. A trough region at 3.7 kHz to 4.2 kHz is formed by a curve 631 corresponding to an example structure 63 of a sound leakage reduction device, which indicates that a resonance cavity in the example structure 63 may absorb the sound waves in the frequency range, thereby achieving the corresponding sound leakage reduction effect. It can be seen that by adjusting specific structural parameters of the example structures 61, 62, and 63 (increasing a count of the sound leakage holes, changing the cavity volume or volume ratio), it is possible to achieve sound leakage reduction effects in different specific frequency ranges.

In other embodiments, in addition to directly increasing or decreasing a volume of a vibration cavity to change a volume ratio (a volume of a resonance cavity may also be adjusted, or the volumes of the vibration cavity and the resonance cavity may be adjusted together), it is also possible to set an equivalent volume of the vibration cavity and the resonance cavity by opening holes in an outer wall. Merely by way of example, referring to FIG. 6, compared with the example structure 63 of the sound leakage reduction device, the volume of the vibration cavity of the example structure 62 is reduced, and other structural parameters are the same. Compared with the frequency range of 3.7 kHz to 4.2 kHz for the sound wave absorption achieved by the example structure 63 (thereby achieving the reduction of sound leakage in this frequency range), the frequency range of 5 kHz to 6 kHz for the sound wave absorption achieved by the example structure 62 is located at a higher frequency band. Compared with the example structure 62 of the sound leakage reduction device, the example structure 61 adds a sound leakage hole, and other structural parameters are the same. Compared with the frequency range of 5 kHz to 6 kHz for the sound wave absorption achieved by the example structure 62, the frequency range of 5.5 kHz to 6.5 kHz for the sound wave absorption achieved by the example structure 61 is located at a higher frequency band. It can be seen that in a specific frequency band (such as 3.5 kHz to 6.5 kHz), the larger the volume of the vibration cavity is, the higher the frequency range for achieving the corresponding sound leakage reduction effect is.

By setting structures of different leakage reduction devices, requirements for sound leakage reduction in different frequency ranges may be achieved. For example, in the structural setting of a specific speaker or earphone, it is desirable to obtain a better sound leakage reduction effect in a sound frequency range (for example, less than 5 kHz) where the human ear is sensitive. The frequency range (e.g., 2.5 kHz to 3.5 kHz) achieved by the sound leakage reduction device 200 in the embodiment 1 and the frequency range (e.g., 3.5 kHz to 4.5 kHz) achieved by the sound leakage reduction device 300 in the embodiment 2 both are in the frequency range that the human ear is sensitive to. Therefore, the structures of the sound leakage reduction device in the embodiment 1 and the embodiment 2 (including other feasible equivalent structures) may be selected to achieve a relatively good sound leakage reduction effect.

Figure 10:
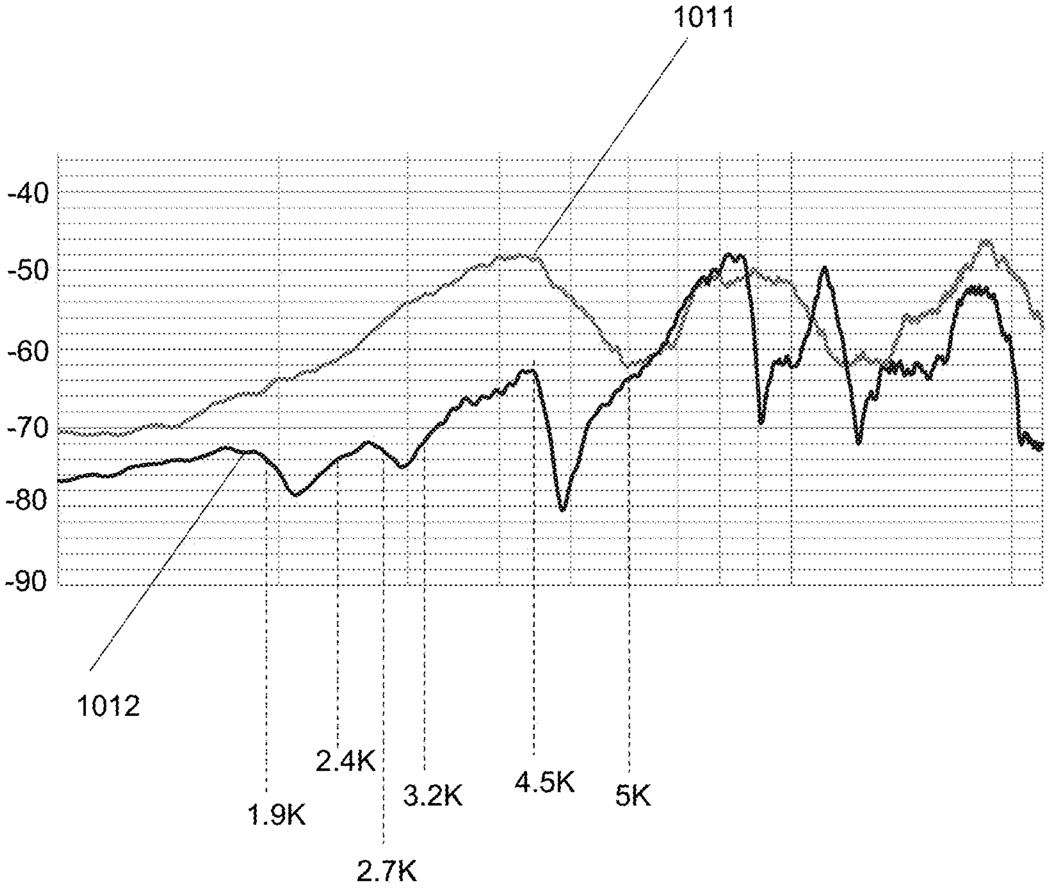
FIG. 10 is a schematic diagram illustrating curves of sound leakage of sound leakage reduction devices according to some embodiments of the present disclosure.

FIGS. 7-9 are schematic diagrams each of which illustrates an exemplary structure of a sound leakage reduction device according to some embodiments of the present disclosure. FIG. 10 is a schematic diagram illustrating curves of sound leakage of sound leakage reduction devices according to some embodiments of the present disclosure.

Embodiment 4

As shown in FIG. 7, a sound leakage reduction device 700 may be provided with a first resonance cavity 210 and a second resonance cavity 220. The first resonance cavity 210 may be disposed on a first side wall 230 of a vibration cavity 140, the first resonance cavity 210 may be in air conduction communication with the vibration cavity 140 through a first communication hole 231 on the first side wall 230. The second resonant cavity 220 may be in air conduction communication with the first resonance cavity 210 through a second communication hole 241 on a second side wall 240.

In some embodiments, in order to obtain a frequency band in which a specific frequency range of the desired sound leakage reduction is located, corresponding transformation settings may be performed on structural parameters such as respective volume or a volume ratio of the two resonance cavities, a volume ratio of a total volume of the two resonance cavities to a volume of the vibration cavity, a count of the communication holes, respective diameter or a total diameter of the resonance cavities, respective length or a total length of the communication holes, and ratios of various size parameters of the communication holes, etc. Merely by way of example, the frequency band in which the specific frequency range of the sound leakage reduction may be obtained by increasing a volume ratio of a volume of one of the resonance cavities or the total volume of the two resonance cavities to the volume of the vibration cavity. In addition, in other embodiments, any possible structural transformation setting may be adopted, which are not listed one by one here.

Embodiment 5

As shown in FIG. 8, a sound leakage reduction device 800 may be provided with a first resonance cavity 210 and a second resonance cavity 220. The first resonance cavity 210 and the second resonance cavity 220 may be both disposed on a first side wall 230 of a vibration cavity 140. The first resonance cavity 210 may be in air conduction communication with the vibration cavity 140 through a first communication hole 231 on the first side wall 230. The second resonance cavity 220 may be in air conduction communication with the vibration cavity 140 through a third communication hole 232 on the first side wall 230.

In some embodiments, in order to obtain a frequency band in which a specific frequency range of the desired sound leakage reduction is located, corresponding transformation settings may be performed on structural parameters such as respective volume or a volume ratio of the two resonance cavities, and a volume ratio of a total volume of the two resonance cavities to a volume of the vibration cavity, a count of the communication holes, respective diameter or a total diameter of the resonance cavities, respective length or a total length of the communication holes, and ratios of various size parameters of the communication holes, etc. Merely by way of example, the frequency band in which the specific frequency range of the sound leakage reduction may be obtained by reducing a volume ratio of a volume of one of the resonance cavities or the total volume of the two resonance cavities to the volume of the vibration cavity. In addition, in other embodiments, any possible structural transformation setting may be adopted, which are not listed one by one here.

Embodiment 6

As shown in FIG. 9, a sound leakage reduction device 900 may be provided with a third resonance cavity 310 and a fourth resonance cavity 320. The third resonance cavity 310 may be disposed on a first side wall 230 of a vibration cavity 140. The third resonance cavity 310 may be in air conduction communication with the vibration cavity 140 through a first communication hole 231 on the first side wall 230. The fourth resonance cavity 320 may be disposed on a third side wall 330 of the vibration cavity 140. The fourth resonance cavity 320 may be in air conduction communication with the vibration cavity 140 through a fourth communication hole 331 on the third side wall 330.

As shown in FIG. 10, a curve 1011 of sound leakage is obtained by testing a sound leakage reduction device with an initial structure in which only the vibration cavity is provided without the resonance cavity. A curve 1012 of sound leakage is obtained by testing the sound leakage reduction device 900 shown in FIG. 9. Compared the curves 1012 and 1011, trough regions are formed in specific frequency ranges (e.g., 1.9 kHz to 2.4 kHz, 2.7 kHz to 3.2 kHz, 4.5 kHz to 5 kHz) of the curve 1012 corresponding to the sound leakage reduction device 900 that is provided with two resonance cavities disposed in parallel on different side walls of the vibration cavity. The trough region in the specific frequency range (e.g., 1.9 kHz to 2.4 kHz) is generated by setting the fourth resonance cavity 320. The trough region in the specific frequency range (e.g., 2.7 kHz to 3.5 kHz) is generated by setting the third resonance cavity 310. In the specific frequency range (e.g., 4.5 kHz to 5 kHz), compared with a trough region of the vibration cavity 140 in the curve 1011 corresponding to the sound leakage reduction device in which the communication hole is not disposed, due to the addition of the first communication hole 231 on the first side wall 230 between the vibration cavity 140 and the third resonance cavity 310, a depth and a frequency band corresponding to the trough region of the vibration cavity 140 change, which indicates that a relatively significant sound leakage reduction effect is achieved in multiple specific frequency ranges.

In other embodiments, according to the sound leakage reduction effect shown in FIG. 10, it can be seen that corresponding frequency ranges of the sound leakage reduction may be obtained by setting respective structures or a combination of structures of the vibration cavity (such as the vibration cavity 140) and the resonance cavity (such as the third resonance cavity 310 and the fourth resonance cavity 320). For example, in order to enhance the sound leakage reduction effect in a specific frequency range (such as 1.5 kHz to 3 kHz), volumes of the vibration cavity and/or the resonance cavity or sizes of the communication holes may be set to make trough regions of the vibration cavity and/or the resonance cavity locate in a relatively small specific frequency range, that is, a difference between frequencies of the sound leakage reduction corresponding to the vibration cavity and the resonance cavity is in a small difference range, for example, 0.1 kHz to 0.3 kHz. As another example, in order to obtain a wide specific frequency range (e.g., 1 kHz to 5 kHz), the volumes of the vibration cavity and/or the resonance cavity or the sizes of the communication holes may be set to make the trough regions of the vibration cavity and/or the resonance cavity to be relatively dispersed or evenly distributed in a relatively wide frequency range. For example, a frequency range of a trough region generated by the fourth resonance cavity 320 is in a frequency range of 1 kHz to 2.5 kHz. A frequency range of a trough region generated by the third resonance cavity 310 is in a frequency range of 2.5 kHz to 4 kHz. A frequency range of a trough region generated by the vibration cavity 140 is in a frequency range of 4 kHz to 5 kHz.

In other embodiments, if it is desired to increase or decrease the specific frequency range of the sound leakage reduction, corresponding transformation settings may be performed on structural parameters such as a position transformation of the two resonance cavities on different side walls, respective volume or a volume ratio of the two resonance cavities, a volume ratio of a total volume of the two resonance cavities to a volume of the vibration cavity, a count of the communication holes, respective diameter or a total diameter of the communication holes, respective length or a total length of the communication holes, and ratios of various size parameters of the communication holes, etc. Merely by way of example, the specific frequency range of the sound leakage reduction may be reduced by increasing the volume of the resonance cavity (the fourth resonance cavity 320 shown in FIG. 9) disposed on the side wall of the vibration panel 121 of the sound leakage reduction device. In addition, in some other embodiments, any possible structural transformation setting may be adopted, which are not listed one by one here.

In other embodiments, the sound leakage reduction effect may be adjusted by changing structural parameters of the vibration cavity, the resonance cavity (e.g., a count of the cavities, shapes of the cavities, sizes of the cavities, a volume ratio between the vibration cavity and the resonance cavity, specific positions of the cavities, a positional relationship between the cavities, etc.), the communication holes, and/or the sound leakage holes (e.g., shapes of the holes, a count of the holes, sizes of the holes, etc.).

Through such different structural transformation settings of the sound leakage reduction device, implementable solutions capable of meeting requirements for sound leakage reduction in a variety of different frequency ranges are further provided. In addition, corresponding equivalent or transformation structure settings may be performed according to more detailed specific sound leakage reduction requirements, thereby optimizing the sound leakage reduction performance to a large extent and meeting the diversified needs of users.

Figure 12:
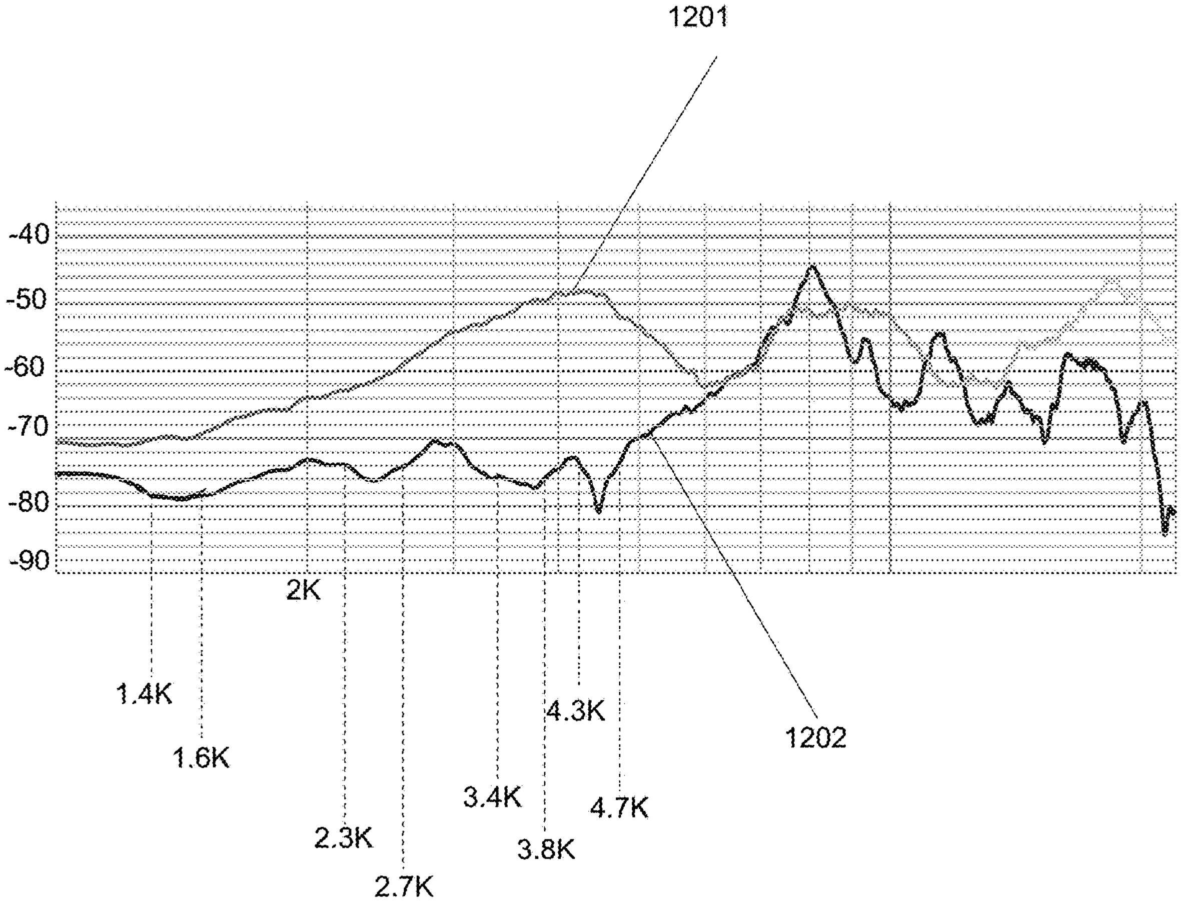
FIG. 12 is a schematic diagram illustrating curves of sound leakage of sound leakage reduction devices according to some embodiments of the present disclosure.

FIG. 11 is a schematic diagram illustrating an exemplary structure of a sound leakage reduction device according to some embodiments of the present disclosure. FIG. 12 is a schematic diagram illustrating curves of sound leakage of sound leakage reduction devices according to some embodiments of the present disclosure.

Embodiment 7

As shown in FIG. 11, a sound leakage reduction device 1100 may be provided with a third resonance cavity 310, a fourth resonance cavity 320, and a fifth resonance cavity 340. The third resonance cavity 310 may be disposed on a first side wall 230 of a vibration cavity 140. The third resonance cavity 310 may be in air conduction communication with the vibration cavity 140 through a first communication hole 231 on the first side wall 230. The fourth resonance cavity 320 may be disposed on a third side wall 330 of the vibration cavity 140. The fourth resonance cavity 320 may be in air conduction communication with the vibration cavity 140 through a fourth communication hole 331 on the third side wall 330. The fifth resonance cavity 340 may be disposed on a fourth side wall 350 of the vibration cavity 140. The fifth resonance cavity 340 may be in air conduction communication with the vibration cavity 140 through a fifth communication hole 351 on the fourth side wall 350. As shown in FIG. 12, a curve 1201 of sound leakage is obtained by testing a sound leakage reduction device with an initial structure in which only the vibration cavity is provided without the resonance cavity. A curve 1202 od sound leakage is obtained by testing the sound leakage reduction device 1100 shown in FIG. 11. Compared the curves 1201 and 1202, multiple trough regions are formed in multiple specific frequency ranges (e.g., 1.4 kHz to 1.6 kHz, 2.3 kHz to 2.7 kHz, 3.4 kHz to 3.8 kHz, and 4.3 kHz to 4.7 kHz). The trough region in the specific frequency range (e.g., 1.4 kHz to 1.6 kHz) is generated by setting the third resonance cavity 310. The trough region in the specific frequency range (e.g., 2.3 kHz to 2.7 kHz) is generated by setting the fourth resonance cavity 320. The trough region in the specific frequency range (e.g., 3.4 kHz to 3.8 kHz) is generated by setting the fifth resonance cavity 340. Compared with a trough region of the vibration cavity 140 in the curve 1201 corresponding to the sound leakage reduction device in which the communication hole is not disposed, due to the addition of the first communication hole 231 on the first side wall 230 between the vibration cavity 140 and the third resonance cavity 310, a depth and a frequency band corresponding to the trough region change, which indicates that a significant sound leakage reduction effect is achieved in multiple specific frequency ranges. Compared with the sound leakage reduction device 900 described in the embodiment 6, in the specific frequency band (e.g., 1 kHz to 5 kHz), the sound leakage reduction device 1100 has the characteristics of a lower frequency band of the sound leakage reduction, a slower frequency band trend, a more comprehensive frequency band distribution, and a more significant sound leakage reduction effect in the low frequency band.

In other embodiments, according to the sound leakage reduction effect shown in FIG. 12, it can be known that the corresponding frequency ranges of the sound leakage reduction may be obtained by setting respective structures or a combination of structures of the vibration cavity (such as the vibration cavity 140) and the resonance cavity (such as the third resonance cavity 310, the fourth resonance cavity 320, and the fifth resonance cavity 340). For example, in order to enhance the sound leakage reduction effect in a specific frequency range (such as 1 kHz to 3 kHz), volumes of the vibration cavity and/or the resonance cavity or sizes of the communication holes may be set to, make trough regions of the vibration cavity and/or the resonance locate in a relatively small specific frequency range, that is, a difference between the frequencies of the sound leakage reduction corresponding to the vibration cavity and/or the resonance cavity is in a small difference range, for example, 0 kHz to 0.2 kHz. As another example, in order to obtain a wide specific frequency range (e.g., 1 kHz to 6 kHz), the volumes of the vibration cavity and/or the resonance cavity or the sizes of the communication holes may be set to make the trough regions of the vibration cavity and/or the resonance cavity to be relatively dispersed or evenly distributed in a relatively wide frequency range. For example, a frequency range of a trough region generated by the third resonance cavity 310 is in a frequency range of 1 kHz to 2 kHz. A frequency range of a trough region generated by the fourth resonance cavity 320 is in a frequency range of 2 kHz to 3.5 kHz. A frequency range of a trough region generated by the fifth resonance cavity 340 is in a frequency range of 3.5 kHz to 5 kHz. A frequency range of a trough region generated by the vibration cavity 140 is in a frequency range of 5 kHz to 6 kHz.

In other embodiments, if it is desired to increase or decrease the specific frequency range of the sound leakage reduction, corresponding transformation settings may be performed on structural parameters such as a position transformation of the three resonance cavities on different side walls, respective volume or a volume ratio of the three resonance cavities, a volume ratio of a total volume of the three resonance cavities to a volume of the vibration cavity, a count of the communication holes, respective diameter or a total equivalent diameter of the communication holes, respective length or a total length of the communication holes, and ratios of various size parameters of the communication holes, etc. Merely by way of example, as shown in FIG. 11, when a volume of the fourth resonance cavity 320 is larger than that of the fifth resonance cavity 340 and other structural parameters remain unchanged, by increasing the volume of the vibration cavity, the frequency band where the trough region that reflects the frequency range of the sound leakage reduction is located goes to the lower frequency band. In addition, in some other embodiments, any possible structural transformation setting may be adopted, which are not listed one by one here.

In other embodiments, the sound leakage reduction effect may be adjusted by changing structural parameters of the vibration cavity, the resonance cavity (e.g., a count of the cavities, shapes of the cavities, sizes of the cavities, a volume ratio between the vibration cavity and the resonance cavity, specific positions of the cavities, a positional relationship between the cavities, etc.), the communication holes, and/or the sound leakage holes (e.g., shapes of the holes, a count of the holes, sizes of the holes, etc.).

Figure 13:
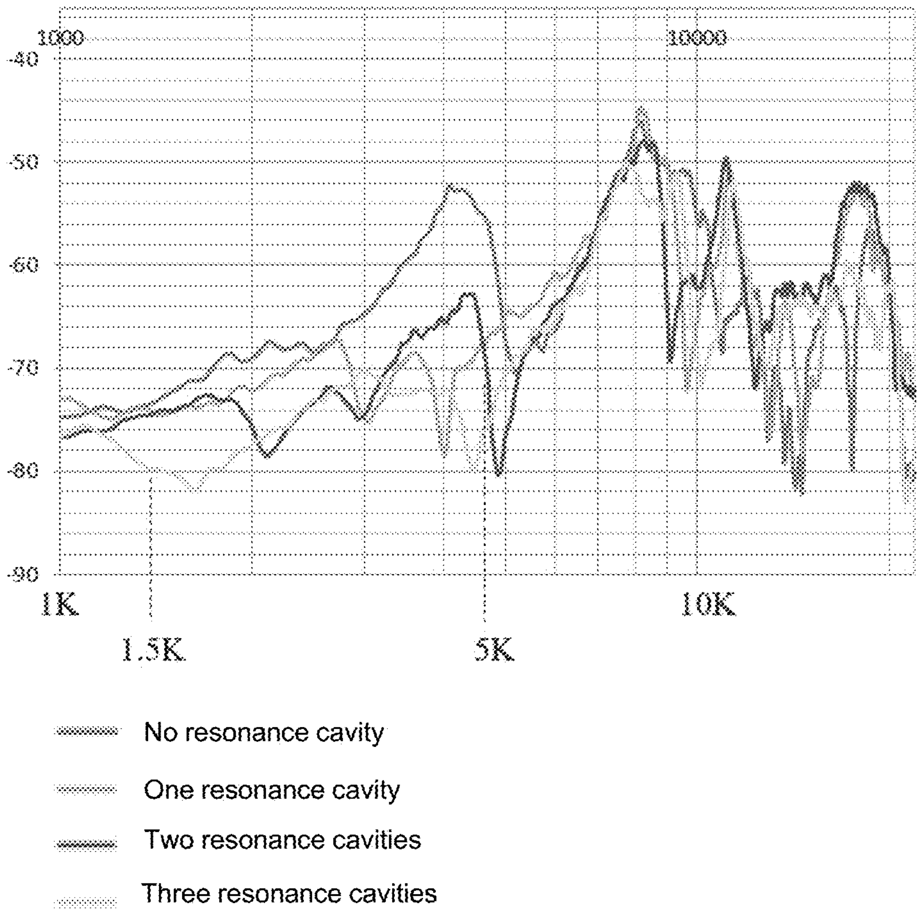
FIG. 13 is a schematic diagram illustrating curves of sound leakage of sound leakage reduction devices according to some embodiments of the present disclosure.

FIG. 13 is a schematic diagram illustrating curves of sound leakage of sound leakage reduction devices according to some embodiments of the present disclosure. The curves of sound leakage of the sound leakage reduction devices with a variety of transformation settings of the structure of resonance cavities are shown in FIG. 13. Specifically, the sound leakage reduction devices includes a sound leakage reduction device that includes no resonance cavity, a sound leakage reduction device that includes one resonance cavity in series with the vibration cavity (e.g., the sound leakage reduction device 100 shown in FIG. 1), a sound leakage reduction device that includes two resonance cavities one of which in series with the vibration cavity and the other in parallel with the vibration cavity (e.g., the sound leakage reduction device 900 shown in FIG. 9), a sound leakage reduction device that includes three resonance cavities one of which in series with the vibration cavity and the other in parallel with the vibration cavity (e.g., the sound leakage reduction device 1100 shown in FIG. 11). Compared with the sound leakage reduction device that includes no resonance cavity, the addition of the resonant cavity makes the formed trough regions are distributed in the frequency range 1.5 kHz to 5 kHz. Compared with the sound leakage reduction device that includes no resonance cavity, a sound pressure level of sound leakage reduction corresponding to the sound leakage reduction device including one or more resonance cavities reaches more than 25 dB or even reaches 30 dB. In addition, according to the requirements, by setting the structure of the sound leakage reduction device including one or more resonance cavities, a corresponding frequency range interval of sound leakage reduction may be realized, so as to meet the requirements of sound leakage reduction in various working scenarios.

In some embodiments, the resonance cavity (e.g., the resonance cavity 150 in FIGS. 1-4, the first resonance cavity 210, the second resonance cavity 220, the third resonance cavity 310, the fourth resonance cavity 320, and the fifth resonance cavity 340 in FIGS. 7-9 and FIG. 11, or the like) described in the embodiments of the present disclosure may be a cavity structure disposed inside the vibration cavity 140 and formed by at least one baffle plate and an inner wall of the housing 130. In some embodiments, the aforementioned resonance cavity may be a cavity structure formed by one (or one piece) baffle plate and three inner walls of the housing 130. In some embodiments, the aforementioned resonance cavity may be a cavity structure formed by two (or two pieces) baffles and two inner walls of the housing 130. In some embodiments, the aforementioned resonance cavity may be a cavity structure formed by an integrally formed baffle and an inner wall of the housing 130. For example, the integrally formed baffle may be a hollow cuboid, a hollow cube, or the like. In some embodiments, the aforementioned resonance cavity may be a non-closed cavity with an opening.

Figure 14:
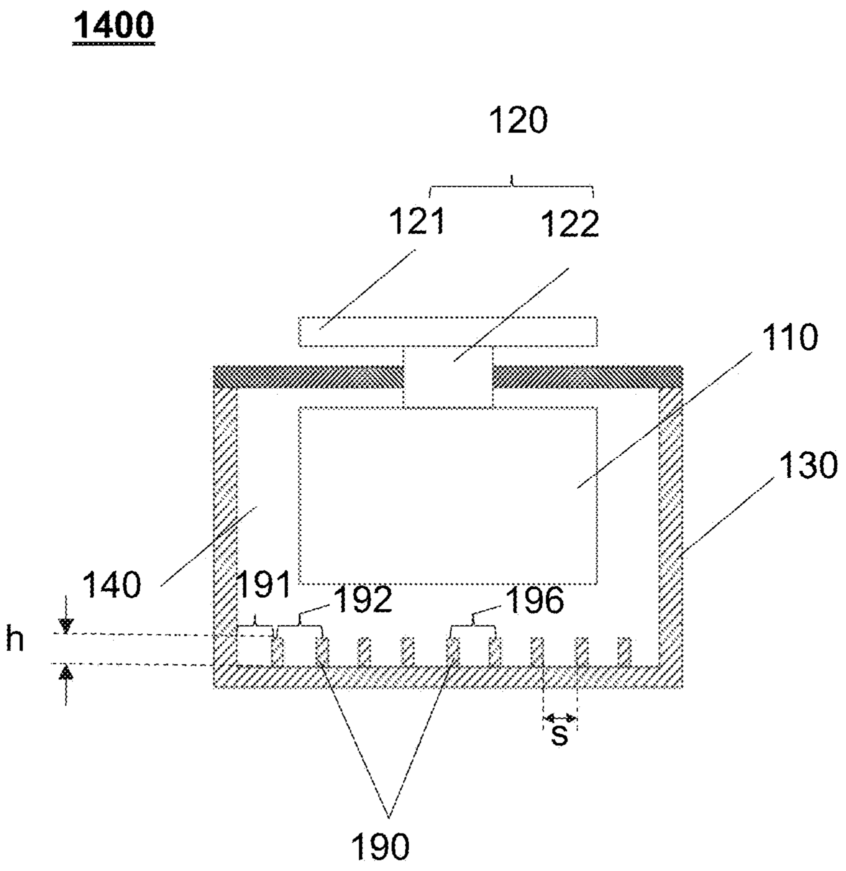
FIG. 14 is a schematic diagram illustrating an exemplary structure of a sound leakage reduction device according to some embodiments of the present disclosure.

FIG. 14 is a schematic diagram illustrating an exemplary structure of a sound leakage reduction device according to some embodiments of the present disclosure. In some embodiments, a structural transformation (as shown in FIG. 14) may be performed on a resonance cavity (e.g., the resonance cavity 150 shown in FIGS. 1-4, the first resonance cavity 210, the second resonance cavity 220, the third resonance cavity 310, the fourth resonance cavity 320, and the fifth resonance cavity 340 in FIGS. 7-9 and FIG. 11) described in the embodiments of the present disclosure. In a sound leakage reduction device 1400, one or more resonance cavities (e.g., resonance cavities 191, 192, 196) may be non-closed cavities formed by multiple baffles 190 or columns disposed on an inner wall of a vibration cavity 140 (or an inner wall of a housing 130) and the inner wall of the vibration cavity 140 (e.g., the resonance cavity 191). According to the need of reducing sound leakage at a specific frequency, a count and heights h of the baffles 190, and a width s of the resonant cavity may be within a corresponding range of values. In some embodiments, the heights h of the baffles 190 of different resonance cavities (e.g., the resonance cavities 191, 192, 196) and widths s of different resonance cavities may be the same or different. In some embodiments, specific frequencies of sound leakage reduction achieved by different resonance cavities (e.g., the resonance cavities 191, 192, 196) may be the same or different. In some embodiments, the baffles 190 may be disposed on any inner wall of the vibration chamber 140 (or any inner wall of the housing 130), for example, other inner walls of the vibration chamber 140 as shown in FIG. 14. It should be noted that the structural transformation of the resonant cavity here is only an example. In the scope of the present disclosure, other structural transformations that may achieve the effect of reducing sound leakage at a specific frequency may also be made, which are not limited in the embodiments of the present disclosure.

Figure 15:
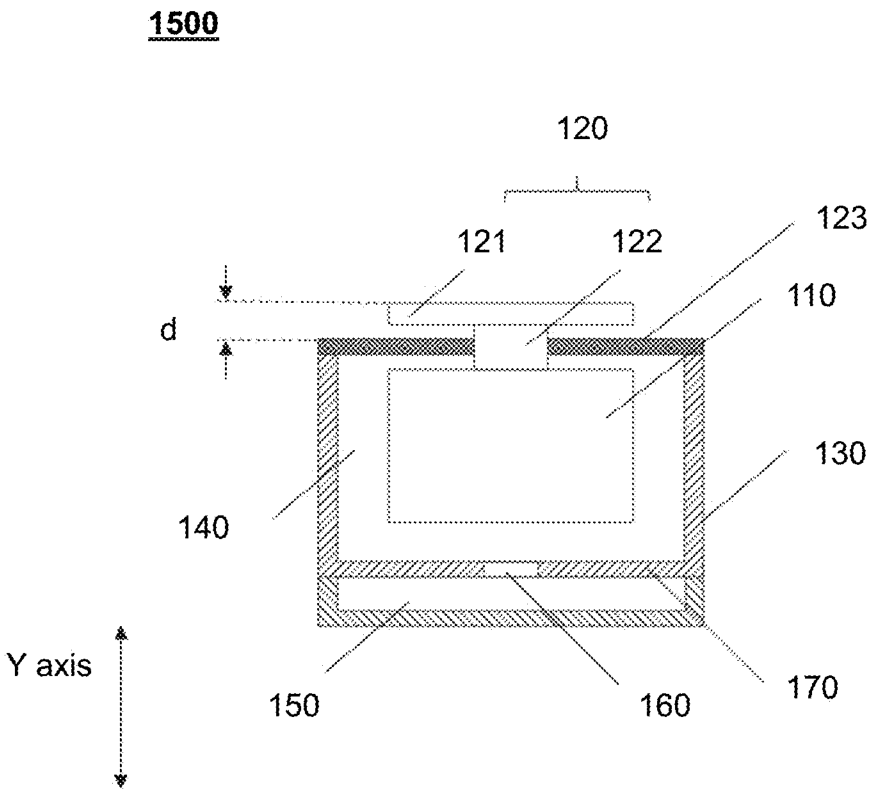
FIG. 15 is a schematic diagram illustrating an exemplary structure of a sound leakage reduction device according to some embodiments of the present disclosure.

FIG. 15 is a schematic diagram illustrating an exemplary structure of a sound leakage reduction device according to some embodiments of the present disclosure. As shown in FIG. 15, there may be a predetermined distance d between a vibration panel 121 of a vibration structure 120 and a housing 130. In some embodiments, the predetermined distance d refers to a distance between an upper surface of the vibration panel 121 and an outer surface of a side wall 123 of the housing 130. The predetermined distance d may be adjusted by adjusting a height of a vibration conduction member 122 outside the housing 130. The height of the vibration conduction member 122 refers to a height of the vibration conduction member 122 in a Y-axis direction, that is, a vibration direction of an energy conversion structure 110. In some embodiments, the predetermined distance d between the vibration panel 121 and the housing 130 may affect a size of an opening (or a gap) between the vibration structure 120 and the housing 130. In some embodiments, the size of the predetermined distance d between the vibration panel 121 and the housing 130 may be positively correlated with a size of the opening (or a gap) between the vibration structure 120 and the housing 130. Specifically, the larger the predetermined distance d between the vibration panel 121 and the housing 130 is, the larger the size of the opening (or a gap) between the vibration structure 120 and the housing 130 is; the smaller the predetermined distance d between the vibration panel 121 and the housing 130 is, the smaller the size of the opening (or a gap) between the vibration structure 120 and the housing 130 is.

In some embodiments, by changing the predetermined distance d between the vibration panel 121 and the housing 130 and the size of the opening (or a gap) between the vibration structure 120 and the housing 130, additional influence of the predetermined distance d and the opening on the sound leakage reduction effect of the leakage reduction device 1500 may be adjusted. Specifically, the larger the predetermined distance d between the vibration panel 121 and the housing 130 is, the larger the size of the opening (or a gap) between the vibration structure 120 and the housing 130 is, the stronger the sound leakage reduction capability of the sound leakage reduction device 1500 is. Based on the above, in order to adjust the additional influence of the predetermined distance d and the opening on the sound leakage reduction effect of the sound leakage reduction device 1500 to improve the sound leakage reduction effect of the sound leakage reduction device 1500 to different degrees, the predetermined distance d between the vibration panel 121 and the housing 130 may be set within a relatively large range. In some embodiments, according to the requirements of sound leakage reduction of a qualified product, the predetermined distance d may be between 0.5 mm and 4 mm. In some embodiments, in order to obtain a more appropriate sound leakage reduction effect, the predetermined distance d may be between 1 mm and 3 mm.

Figure 16:
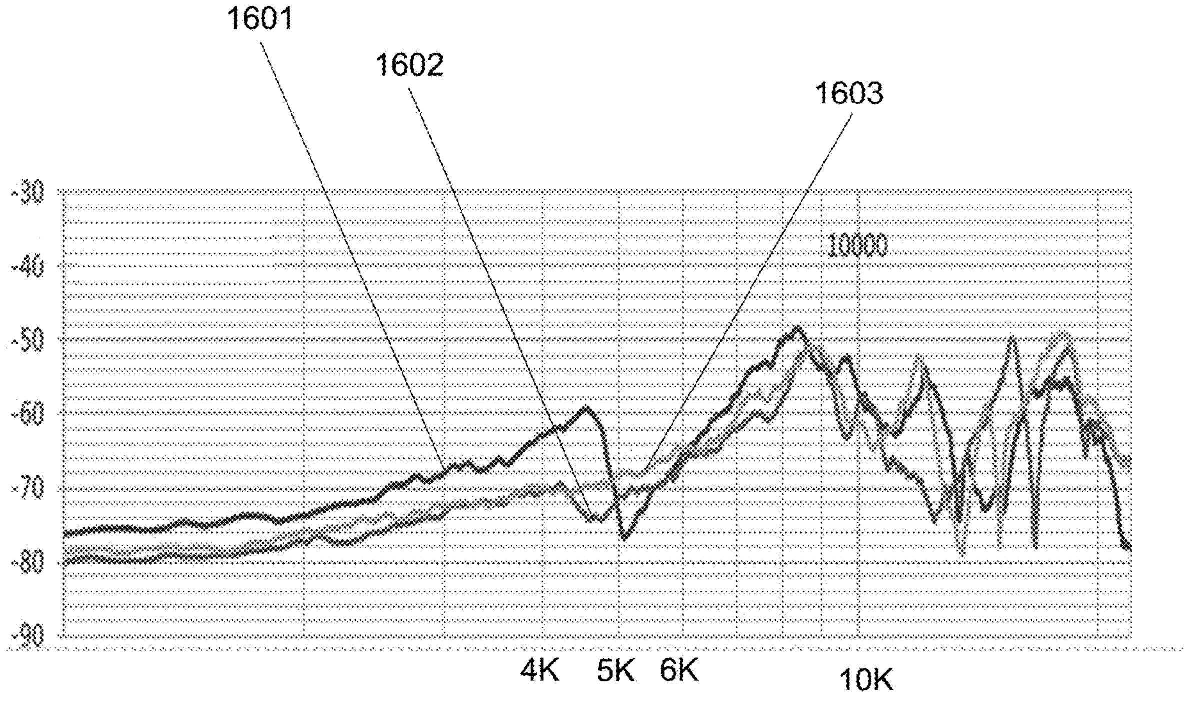
FIG. 16 is a schematic diagram illustrating curves of sound leakage of sound leakage reduction devices according to some embodiments of the present disclosure.

FIG. 16 is a schematic diagram illustrating curves of sound leakage of sound leakage reduction devices according to some embodiments of the present disclosure. A curve 1601 represents a curve of sound leakage of a sound leakage reduction device having a first predetermined distance. A curve 1602 represents a curve of sound leakage of a sound leakage reduction device having a second predetermined distance. A curve 1603 represents a curve of sound leakage of a sound leakage reduction device having a third predetermined distance. The first predetermined distance is smaller than the second predetermined distance, and the second predetermined distance is smaller than the third predetermined distance. By comparing the curve 1601, the curve 1602, and the curve 1603, within a specific frequency range (e.g., 4 kHz-6 kHz), the curve 1601 has a widest frequency range of sound leakage reduction, followed by the curve 1602, and the curve 1603 shows that the sound leakage reduction effect is hardly improved. It can also be understood that the sound leakage reduction effect of the sound leakage reduction devices 1500 with different settings of the first distance, the second distance, and the third distance is from strong to weak. It can be seen from the above analysis that, within a specific frequency range and a specific distance that meets product requirements, the larger the predetermined distance between the vibration panel 121 and the housing 130, the stronger the sound leakage reduction effect of the sound leakage reduction device 1500 is.

Referring to FIG. 15, in some embodiments, an area and a shape of the vibration panel 121 may affect a magnitude of the sound leakage of the sound leakage reduction device 1500, thereby affecting the sound leakage reduction effect of the sound leakage reduction device 1500. Specifically, the larger the area of the vibration panel 121 is, the weaker the sound leakage reduction effect of the sound leakage reduction device is. In some embodiments, the vibration panel 121 is in contact with a human body part (e.g., face), and sound may be transmitted to the user through the vibration panel 121. The larger the area of the vibration panel 121 is, the larger the contact area between the vibration panel 121 and the user's body is, the larger the vibration sound received by the user is, and the larger the sound leakage generated by the vibration panel 121 is. Based on the above, in order to improve the sound leakage reduction capability of the sound leakage reduction device 1500, the area of the vibration panel 131 may be relatively small. In some embodiments, in order to obtain a relatively wide vibration panel and meet the requirements of sound leakage reduction of a qualified product, the area of the vibration panel 121 may be 9 $mm^2$-700 $mm^2$. In some embodiments, in order to obtain a more appropriate leakage effect, the area of the vibration panel 121 can be 25 $mm^2$-330 $mm^2$.

In some embodiments, a shape of the vibration panel 121 may be a regular (e.g., a circle, a rectangle, an ellipse, a pentagon, etc.) and/or an irregular shape. It should be noted that the sound leakage reduction device 1500 may not include the vibration panel 121, the vibration conduction member 122 may be in contact with the body part, and the vibration generated by the energy conversion structure 110 may be directly transmitted to the user through the vibration conduction member 122, so as to reduce the contact area between the vibration structure 120 and the user, thereby reducing the sound leakage of the sound leakage reduction device 1500.

Figure 17:
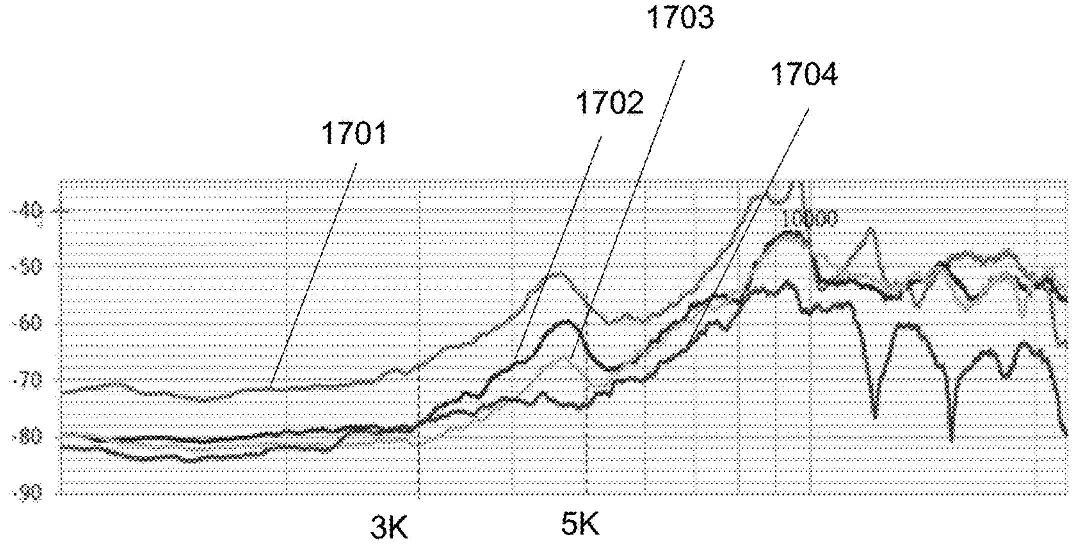
FIG. 17 is a schematic diagram illustrating curves of sound leakage of sound leakage reduction devices according to some embodiments of the present disclosure.

FIG. 17 is a schematic diagram illustrating curves of sound leakage of sound leakage reduction devices according to some embodiments of the present disclosure. A curve 1701 represents a curve of sound leakage of a sound leakage reduction device with a first vibration panel area. A curve 1702 represents a curve of sound leakage of a sound leakage reduction device with a second vibration panel area. A curve 1703 represents a curve of sound leakage of a sound leakage reduction device with a third vibration panel area. A curve 1704 represents a curve of sound leakage of a sound leakage reduction device with a fourth vibration panel area. The area from large to small is the first vibration panel area, the second vibration panel area, the third vibration panel area, and the fourth vibration panel area. By comparing the curve 1701, the curve 1702, the curve 1703, and the curve 1704, in a specific frequency range (e.g., 3 kHz-5 kHz), the curve 1701 has the worst sound leakage reduction effect, the curve 1702 has the next, the curve 1703 has the next best sound leakage reduction effect, and the curve 1704 has the best sound leakage reduction effect. It can also be understood that the sound leakage reduction effect from strong to weak is the curve 1704, the curve 1703, the curve 1702, and the curve 1701. It can be seen from the above analysis that, within a specific frequency range and a specific vibration panel area that meets product requirements, the smaller the area of the vibration panel 121 is, the smaller the contact area between the vibration panel 121 and the body part of the user is, and the better the sound leakage reduction effect of the sound leakage reduction device 1500 is.

Figure 18:
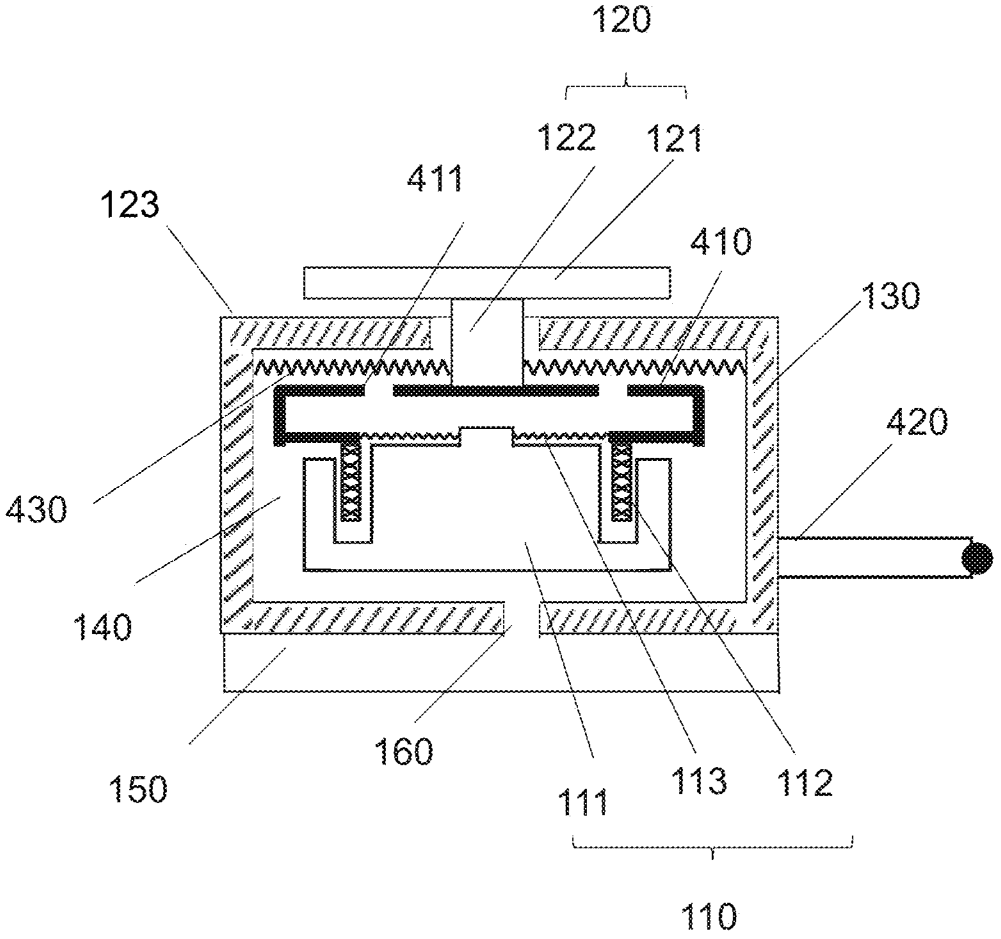
FIG. 18 is a schematic diagram illustrating an exemplary structure of an acoustic output device according to some embodiments of the present disclosure.

FIG. 18 is a schematic diagram illustrating an exemplary structure of an acoustic output device according to some embodiments of the present disclosure. As shown in FIG. 18, an acoustic output device 1800 may include an energy conversion structure 110, a vibration structure 120, and a housing 130. The acoustic output device shown in FIG. 18 may include any of the aforementioned sound leakage reduction devices (e.g., the sound leakage reduction device 100, the sound leakage reduction device 200, the sound leakage reduction device 300, etc.). One or more components in the acoustic output device 1800 may be the same or similar to one or more components in the aforementioned sound leakage reduction devices, e.g., the housing 130, the vibration cavity 140, the resonance cavity 150, the communication hole 160, or the like.

In some embodiments, the acoustic output device 1800 may be a speaker. In some embodiments, the speaker may include a bone conduction speaker, an air conduction speaker, or a bone-air conduction combined speaker. In other embodiments, the speaker may include any other feasible speaker, which is not limited in the embodiments of the present disclosure.

In some embodiments, taking the acoustic output device 1800 as a bone conduction speaker as an example, the acoustic output device 1800 may be a device that converts sound signals into mechanical vibrations of different frequencies. For example, the acoustic output device 1800 may be an earphone (e.g., a bone conduction earphone, etc.), a hearing aid (e.g., a bone conduction hearing aid, etc.), or the like. The energy conversion structure 110 of the acoustic output device 1800 may convert the sound signals into the mechanical vibrations. One end of the vibration structure 120 may be directly or indirectly connected to the energy conversion structure 110, and the vibration structure 120 may generate vibration based on the mechanical vibrations of the energy conversion structure 110. The other end of the vibration structure 120 may be in direct or indirect contact with a user's body part to transmit the mechanical vibrations to the user's auditory center through the user's body part (e.g., skull, bone labyrinth, etc.), and the user may receive bone conduction sound waves. In some embodiments, the earphone may include a headphone, an ear-hung earphone, a back-hung earphone, an in-ear earphone, an open earphone, a split earphone, an over-ear earphone, a neck-hung earphone, a neckband earphone, or a glasses-type headphone, etc. Specific structures of the aforementioned earphones are not limited in the embodiments of the present disclosure.

In some embodiments, the vibration structure 120 may include a vibration panel 121 and a vibration conduction member 122. The vibration panel 121 may be located at an end of the vibration structure 120 away from the energy conversion structure 110. The vibration conduction member 122 may be located at an end of the vibration structure 120 close to the energy conversion structure 110. The vibration panel 121 may be connected to the vibration conduction member 122. An opening may be disposed on a side wall 123 of the housing 130. The vibration conduction member 122 may penetrate through the opening, so that one end (an end away from the vibration panel 121) of the vibration conduction member 122 may extend into the vibration cavity 140 and be connected to a bracket 410 of the housing 130.

In some embodiments, the bracket 410 of the housing may be a part of the housing 130, or a separate assembly directly or indirectly connected to the interior of the housing 130. In some embodiments, the bracket 410 of the housing 130 may be secured to an inner surface of the housing 130. In some embodiments, the bracket 410 of the housing 130 may be attached to the housing 130 by glue. For example, the bracket 410 of the housing 130 may be elastically connected to the housing 130 by the elastic connecting member 430, or fixed to the housing 130 by punching, injection molding, clamping, riveting, screw connection, or welding, which is not limited in the embodiments of the present disclosure.

In some embodiments, the bracket 410 of the housing 130 may be provided with at least one bracket hole 411. The bracket hole 411 may lead vibration sound waves in the vibration cavity 140 out of the housing 130 to interfere with leakage sound waves generated by the vibration of the housing 130 to reduce an amplitude of the leakage sound waves, thereby reducing the sound leakage of the acoustic output device 1800. In some embodiments, the bracket hole 411 may be a regular shape such as a circle, an ellipse, a rectangle, etc., and/or an irregular shape, which is not limited in the embodiments of the present disclosure. A count of the bracket hole 411 may be adaptively adjusted according to the application scenario of the acoustic output device 1800, which is not limited in the embodiments of the present disclosure.

In some embodiments, the energy conversion structure 110 may include a magnetic circuit device 111, a coil 112, and a vibration transmission sheet 113. The energy conversion structure 110 may be located inside the housing 130 and disposed on the bracket 410 of the housing 130. One end of the vibration transmission sheet 113 may be connected to the magnetic circuit device 111, and the other end of the vibration transmission sheet 113 may be connected to the bracket 410 of the housing 130 and connected to the vibration structure 120 (e.g., the vibration conduction member 122) through the bracket 410 of the housing 130. In some embodiments, the coil 112 may be fixed on the bracket 410 of the housing 130 and drive the vibration structure 120 to vibrate through the bracket 410 of the housing 130.

In some embodiments, the magnetic circuit device 111 may be configured to form a magnetic field in which the coil 112 may mechanically vibrate. Specifically, the coil 112 may be supplied with a signal current. The coil 112 may be in the magnetic field formed by the magnetic circuit device 11 and subjected to the action of the ampere force in the magnetic field, so as to be driven to generate mechanical vibrations. The mechanical vibrations of the coil 112 may be transmitted to the bracket 410 of the housing 130 which in turn transmits the mechanical vibrations to the vibration structure 120. The mechanical vibration may be transmitted to the user through the vibration conduction member 122 and the vibration panel 121 in the vibration structure 120.

In some embodiments, the magnetic circuit device 111 may include one or more magnetic elements (not shown in the figure). The magnetic elements may be in any feasible structural form, such as ring magnetic elements, or the like. In some embodiments, multiple magnetic elements may increase a total magnetic flux, and the interaction of different magnetic elements may suppress the leakage of magnetic field lines and increase the magnetic induction intensity at the magnetic gap, thereby improving the sensitivity of the speaker (e.g., the bone conduction speaker). In some embodiments, the magnetic circuit device 111 may include a magnetic conductive element (not shown in the figure). The magnetic conductive element may be in any feasible structural form, such as a magnetic conductive plate or a magnetic conductive cover, etc. In some embodiments, the magnetic conductive cover may seal a magnetic circuit generated by the magnetic circuit device 111, so that more magnetic field lines are concentrated in the magnetic gap in the magnetic circuit device 111, so as to suppress magnetic leakage and increase the magnetic induction strength at the magnetic gap, thereby improving the sensitivity of the speaker (such as the bone conduction speaker).

In some embodiments, the housing 130 of the acoustic output device 1800 may be provided with an ear-hook element 420. The ear-hook element 420 may be configured to assist the user in wearing the acoustic output device 1800. In some embodiments, the ear-hook element 420 may be a connecting member for the headphone to a head beam. Taking the acoustic output device 1800 as a back-hung bone conduction device as an example, an end of the ear-hook element 420 may be connected to a side wall of the housing 130 of the acoustic output device 1800. When the user wears the acoustic output device 1800, the end of the ear-hook element 420 may be located in the vicinity of the user's auricle, so that the acoustic output device 1800 may be located in the vicinity of the user's auricle. Further, by changing a position of the housing 130 relative to the ear-hook element 420 and/or a shape or a structure of the ear-hook element 420, a position and a distance of the acoustic output device 1800 relative to the user's auricle may be adjusted.

In some embodiments, the connection between the housing 130 of the acoustic output device 1800 and the ear-hook element 420 may be a fixed connection. The fixed connection may refer to a connection manner such as bonding, riveting, integral formation, or the like. In some embodiments, the connection between the acoustic output device 1800 and the ear-hook element 420 may be a detachable connection. The detachable connection may refer to a connection manner such as a snap connection, a screw connection, or the like.

In some embodiments, a shape of the ear-hook element 420 may be any shape suitable for the auricle, such as arc, semi-circle, broken line, etc. The shape of the ear-hook element 420 may be adaptively adjusted according to the needs of the user, which is not limited in the embodiments of the present disclosure.

In some embodiments, the vibration structure 120 and the housing 130 may be elastically connected, that is, fixedly connected in an elastic connection manner. For example, in some embodiments, the acoustic output device 1800 may include an elastic connecting member 430. The elastic connecting member 430 may be located in the vibration cavity 140 and configured to connect the vibration structure 120 and the housing 130. Specifically, one end of the elastic connecting member 430 may be connected with the vibration conduction member 122 of the vibration structure 120, and the other end of the elastic connecting member 430 may be connected with the inner wall of the housing 130. When the mechanical vibrations generated by the energy conversion structure 110 are transmitted to the vibration conducting member 122, the vibration conduction member 122 generates vibration in response to the mechanical vibrations generated by the energy conversion structure 110 and transmits the vibration to the housing 130 through the elastic connecting member 430, so that the housing 130 generates mechanical vibrations.

In some embodiments, the elastic connecting member 430 may be in a round tube shape, a square tube shape, a special-shaped tube shape, a ring shape, a flat shape, etc., which are not limited in the embodiments of the present disclosure. In some embodiments, the elastic connecting member 430 may be an elastic element. A material of the elastic element may be a material with elastic deformation capability, such as silica gel, metal, rubber, etc., which is not limited in the embodiments of the present disclosure. In the embodiments of the present disclosure, the elastic element is more prone to elastic deformation than the housing 130, so that the housing 130 may move relative to the energy conversion structure 110.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements, and amendments to the present disclosure. These alterations, improvements, and modifications are intended to be suggested by this disclosure, and are within the spirit and scope of the exemplary embodiments of this disclosure. [0102] Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

In addition, unless clearly stated in the claims, the order of processing elements and sequences, the use of numbers and letters, or the use of other names in the present disclosure are not used to limit the order of the procedures and methods of the present disclosure. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially". Unless otherwise stated, "about," "approximate," or "substantially" may indicate ±20% variation of the value it describes. Accordingly, in some embodiments, the numerical parameters used in the specification and claims are approximate values, and the approximation may change according to the characteristics required by the individual embodiments. In some embodiments, the numerical parameter should consider the prescribed effective digits and adopt a general digit retention method. Although in some embodiments, the numerical fields and parameters used to confirm the breadth of its range are approximate values, in specific embodiments, such numerical values are set as accurately as possible within the feasible range.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A sound leakage reduction device, comprising:

an energy conversion structure, a vibration structure, and a housing, wherein the housing includes a vibration cavity and at least one resonance cavity, the energy conversion structure is located in the vibration cavity and connected with the vibration structure, the at least one resonance cavity communicates with the vibration cavity through at least one communication hole, and a volume of each resonance cavity is smaller than a volume of the vibration cavity, wherein one end of the vibration structure is connected to the energy conversion structure and the other end of the vibration structure is in contact with a user's body part to transmit mechanical vibrations of the energy conversion structure to the user's body part, and a volume ratio between the each resonance cavity and the vibration cavity is not less than 0.1.

2. The sound leakage reduction device of claim 1, wherein the at least one resonance cavity includes multiple resonance cavities, the multiple resonance cavities are disposed on the same side wall or different side walls of the vibration cavity and in air conduction communication with the vibration cavity through the at least one communication hole.

3. The sound leakage reduction device of claim 2, wherein the at least one resonance cavity includes a first resonance cavity and a second resonance cavity, the first resonance cavity is disposed on a first side wall of the vibration cavity, the first resonance cavity is in air conduction communication with the vibration cavity through a first communication hole on the first side wall, and the first resonance cavity is in air conduction communication with the second resonance cavity through a second communication hole on a second side wall of the first resonance cavity.

4. The sound leakage reduction device of claim 2, wherein the at least one resonance cavity includes a first resonance cavity and a second resonance cavity, the first resonance cavity and the second resonance cavity are both disposed on a first side wall of the vibration cavity, the first resonance cavity is in air conduction communication with the vibration cavity through a first communication hole on the first side wall, and the second resonance cavity is in air conduction communication with the vibration cavity through a third communication hole on the first side wall.

5. The sound leakage reduction device of claim 2, wherein the at least one resonance cavity includes a first resonance cavity and a second resonance cavity, the first resonance cavity is disposed on a first side wall of the vibration cavity, the first resonance cavity is in air conduction communication with the vibration cavity through a first communication hole on the first side wall, the second resonance cavity is disposed on a third side wall of the vibration cavity, and the second resonance cavity is in air conduction communication with the vibration cavity through a fourth communication hole on the third side wall.

6. The sound leakage reduction device of claim 1, wherein the at least one resonance cavity includes multiple resonance cavities arranged inside the vibration cavity and formed by multiple baffle plates and a same inner wall of the housing.

7. The sound leakage reduction device of claim 1, wherein the at least one resonance cavity reduces sound leakage at a specific frequency, the specific frequency being in a range of 20 Hz to 10000 Hz.

8. The sound leakage reduction device of claim 1, wherein the volume ratio between the each resonance cavity and the vibration cavity is 0.1-1.

9. The sound leakage reduction device of claim 1, wherein the volume of the each resonance cavity is not greater than 6500 $mm^3$.

10. The sound leakage reduction device of claim 9, wherein the volume of the each resonance cavity is not greater than 2100 $mm^3$.

11. The sound leakage reduction device of claim 1, wherein an area of each communication hole is not less than 0.05 $mm^2$.

12. The sound leakage reduction device of claim 1, wherein a distance between the vibration structure and the housing is in a range of 1 mm to 3 mm.

13. The sound leakage reduction device of claim 1, wherein a vibration surface area of the vibration structure is in a range of 9 $mm^2$ to 700 $mm^2$.

14. An acoustic output device, comprising a sound leakage reduction device, wherein the sound leakage reduction device includes:

an energy conversion structure, a vibration structure, and a housing, wherein the housing includes a vibration cavity and at least one resonance cavity, the energy conversion structure is located in the vibration cavity and connected with the vibration structure, the at least one resonance cavity communicates with the vibration cavity through at least one communication hole, and a volume of each resonance cavity is smaller than a volume of the vibration cavity, wherein one end of the vibration structure is connected to the energy conversion structure, and the other end of the vibration structure is in contact with a user's body part to transmit mechanical vibrations of the energy conversion structure to the user's body part, and a volume ratio between the each resonance cavity and the vibration cavity is not less than 0.1.

15. The acoustic output device of claim 14, wherein the vibration structure includes a vibration panel and a vibration conduction member, the vibration conduction member extends into the vibration cavity through an opening of the housing and is connected to a bracket of the housing, and the energy conversion structure is disposed on the bracket of the housing.

16. The acoustic output device of claim 15, wherein housing is provided with a bracket hole.

17. The acoustic output device of claim 14, wherein the vibration structure is elastically connected to the housing.

18. The acoustic output device of claim 15, wherein the energy conversion structure includes a magnetic circuit device and a vibration transmission sheet, one end of the vibration transmission sheet is connected to the magnetic circuit device, and the other end of the vibration transmission sheet is connected to the bracket of the housing and connected to the vibration conduction member through the bracket of the housing.

19. The sound leakage reduction device of claim 1, wherein the vibration structure includes:

a vibration panel located at an end of the vibration structure away from the energy conversion structure, and a vibration conduction member connected to the vibration panel and located at an end of the vibration structure close to the energy conversion structure.

20. The sound leakage reduction device of claim 19, wherein the vibration panel is located outside the housing, one end of the vibration conduction member away from the energy conversion structure is located outside the housing and connected to the vibration panel, and the other end of the vibration conduction member penetrates through the housing and extends into the vibration cavity.

* * * * *